US007603023B2

(12) United States Patent
Kudo

(10) Patent No.: US 7,603,023 B2
(45) Date of Patent: Oct. 13, 2009

(54) RECORDING APPARATUS AND RECORDING METHOD CAPABLE OF RECORDING SERIES OF CONTENT DATA ON DIFFERENT RECORDING MEDIA

(75) Inventor: Toshimichi Kudo, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 800 days.

(21) Appl. No.: 11/003,509

(22) Filed: Dec. 6, 2004

(65) Prior Publication Data
US 2005/0122863 A1 Jun. 9, 2005

(30) Foreign Application Priority Data
Dec. 8, 2003 (JP) ............. 2003-409017
Dec. 8, 2003 (JP) ............. 2003-409018

(51) Int. Cl.
*H04N 5/91* (2006.01)
*H04N 7/00* (2006.01)
*H04N 5/00* (2006.01)

(52) U.S. Cl. ............. 386/67; 386/46; 386/83; 386/95; 386/125; 386/126

(58) Field of Classification Search ............. 386/98, 386/46, 67, 83, 95, 125, 126; 725/43; 369/30.04; 360/15
See application file for complete search history.

(56) References Cited
U.S. PATENT DOCUMENTS 5,260,801 A * 11/1993 Temma et al. ............. 386/122
5,345,433 A    9/1994 Ohga et al. ............. 369/54
5,701,282 A * 12/1997 Matsumoto et al. ...... 369/30.04
5,731,923 A    3/1998 Sakuma ............. 360/69
5,974,018 A   10/1999 Takenaka ............. 369/84
6,501,503 B2 12/2002 Kudo ............. 348/208.99

(Continued)

FOREIGN PATENT DOCUMENTS
EP    1 014 715    6/2000

(Continued)

OTHER PUBLICATIONS
Patent Abstracts of Japan, vol. 2000, No. 9, Oct. 13, 2000 (JP 2000-182358, Jun. 30, 2000).

(Continued)

*Primary Examiner*—Thai Tran
*Assistant Examiner*—Hung Q Dang
(74) *Attorney, Agent, or Firm*—Fitzpatrick, Cella, Harper & Scinto

(57) ABSTRACT

A recording apparatus includes a first recording unit which records image data on a first recording medium, a second recording unit which records the image data on a second recording medium, and a control unit which controls the first recording unit and second recording unit to record the image data representing a series of contents on the first recording medium and subsequently on the second recording medium, and generate identification information indicating that the image data is divisionally recorded image data which is divisionally recorded on the first recording medium and second recording medium and record the identification information on the first recording medium and the second recording medium. With this arrangement, even when only one of the recording media is played back, the user can easily recognize that the series of contents are divisionally recorded on different recording media.

12 Claims, 29 Drawing Sheets

U.S. PATENT DOCUMENTS

| | | | |
|---|---|---|---|
| 6,573,930 B2 | 6/2003 | Kyuma et al. | 348/208.5 |
| 6,734,901 B1 | 5/2004 | Kudo et al. | 348/208.4 |
| 7,000,242 B1 * | 2/2006 | Haber | 725/43 |
| 7,127,736 B2 * | 10/2006 | Kondo et al. | 725/93 |
| 7,178,106 B2 * | 2/2007 | Lamkin et al. | 715/716 |
| 2002/0024893 A1 * | 2/2002 | Hashimoto | 369/30.32 |
| 2002/0135607 A1 * | 9/2002 | Kato et al. | 345/716 |
| 2002/0186961 A1 * | 12/2002 | Kikuchi et al. | 386/98 |
| 2003/0030728 A1 | 2/2003 | Kudo | 348/208.6 |
| 2003/0099460 A1 | 5/2003 | Imada et al. | 386/52 |
| 2003/0223140 A1 * | 12/2003 | Kobata et al. | 360/15 |
| 2003/0227551 A1 | 12/2003 | Kudo | 348/207.99 |
| 2004/0252593 A1 | 12/2004 | Kudo | 369/30.08 |
| 2005/0031307 A1 | 2/2005 | Kudo | 386/83 |

FOREIGN PATENT DOCUMENTS

| | | | |
|---|---|---|---|
| EP | 1 193 712 | | 4/2002 |
| JP | 58-48282 | | 3/1983 |
| JP | 4-335259 | | 11/1992 |
| JP | 5-114196 | | 5/1993 |
| JP | 6-266507 | | 9/1994 |
| JP | 7-87431 | | 3/1995 |
| JP | 8-77681 | | 3/1996 |
| JP | 9-102185 | | 4/1997 |
| JP | 9-106658 | | 4/1997 |
| JP | 10-134546 | | 5/1998 |
| JP | 11-185365 | | 7/1999 |
| JP | 11-297047 | | 10/1999 |
| JP | 2000-40346 | | 2/2000 |
| JP | 2000-182358 | * | 6/2000 |
| JP | 2001-8160 | | 1/2001 |
| JP | 2001-35082 | | 2/2001 |
| JP | 2001-52390 | | 2/2001 |
| JP | 2001-86462 | | 3/2001 |
| JP | 2001-318881 | | 11/2001 |
| JP | 2001-344877 | * | 12/2001 |
| JP | 2002-074839 | * | 3/2002 |
| JP | 2002-74839 | | 3/2002 |
| JP | 2002-100167 | | 4/2002 |
| JP | 2002-304822 | | 10/2002 |
| JP | 2003-134456 | | 5/2003 |
| JP | 2003-230079 | | 8/2003 |
| JP | 2003-324690 | | 11/2003 |

OTHER PUBLICATIONS

Apr. 12, 2005 Search Report in EP 04257482.

* cited by examiner

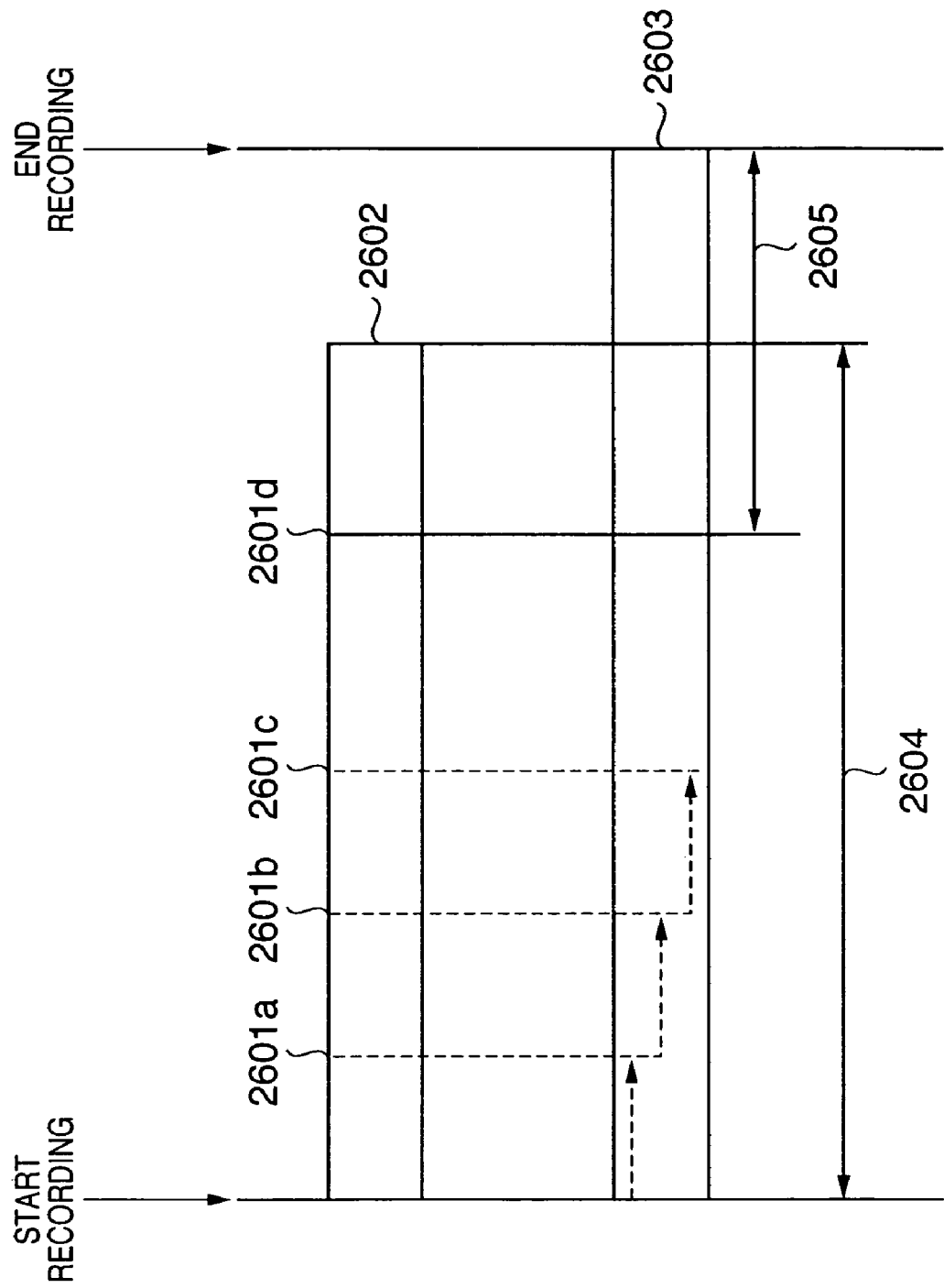

RECORDING APPARATUS AND RECORDING METHOD CAPABLE OF RECORDING SERIES OF CONTENT DATA ON DIFFERENT RECORDING MEDIA

FIELD OF THE INVENTION

The present invention relates to a recording apparatus and recording method and, more particularly, to an apparatus and method of recording a series of pieces of information on a plurality of different recording media.

BACKGROUND OF THE INVENTION

Conventionally, home video recorders which use a magnetic tape such as a VHS tape as a recording medium are popularly used. Along with recent penetration of personal computers, recording devices such as a hard disk drive (to be referred to as an HDD hereinafter) are increasing the capacities, and their prices are also becoming low. Digitization of such video devices is also progressing. Especially, for video cameras, the DV scheme is becoming the mainstream.

Under these circumstances, digitization of home video recorders has also started. Some products are available now, which use, as a recording medium, an optical disk such as a writable DVD medium or an HDD, and encode image and audio data by MPEG2 and record/playback them. These products have a recording/playback function taking advantage of the random accessibility of the recording medium, unlike the conventional products which use a video cassette with a magnetic tape as a recording medium. More specifically, a number of useful functions are implemented, including content management or playback using the random accessibility, long-time recording by compression-coding, and recording/playback concurrent execution in which an already recorded content is played back while executing recording.

In addition, a number of models of hybrid recorders are also commercially available and are becoming popular. The hybrid recorders have a permanent bulk HDD and an optical disk drive which uses a detachable optical disk as a recording medium. In such a product, the user can select an optical disk or HDD for recording. Furthermore, a recorded file can be copied or moved from one to the other.

Some models have a function of automatically recording a program in the HDD from the beginning when, although an optical disk is selected as a recording medium for scheduled recording, no optical disk is loaded or the remaining capacity of a loaded optical disk is insufficient for recording the preselected program, or a function of automatically causing the HDD to continuously execute recording when the remaining capacity of the optical disk has decreased to a predetermined level or less during recording (Japanese Patent Laid-Open No. 2002-74839 (reference 1)). In the latter function, one program (content) is recorded while extending over the optical disk and HDD.

In the prior art of reference 1, assume that one content is recorded over an optical disk and HDD, and, of the content recorded over the two recording media (such a content will be referred to as a relay content hereinafter), only the data recorded on the optical disk is played back by another device. In this case, the user cannot know whether the content recorded on the optical disk comes to a full stop or has more to follow. That is, the user cannot recognize that the data played back is a relay content.

Similarly, assume that the optical disk on which the first half of the relay content is recorded is not loaded in the recorder, and only the data of the second half of the relay content recorded in the HDD is played back. In this case, the user cannot recognize whether the data of the first half of the content is recorded separately. Even when the content is a relay content, there is no means for notifying the user of it.

In reference 1, if the user wants to record the relay content wholly on one disk, the part recorded on the optical disk must temporarily be saved in the HDD. Then, the user newly inserts a blank disk.

Assume that image data played back from, e.g., a video tape is recorded on an optical disk, and a part unrecorded due to shortage of the storage capacity of the optical disk is continuously recorded in the HDD (relay recording). At this time, recording in the HDD cannot be executed from a proper point to start.

SUMMARY OF THE INVENTION

The present invention has been made to solve the above-described problems, and has as its object to make it possible to easily recognize that one content is divisionally recorded over a plurality of recording media.

It is another object of the present invention to make it possible to record, in one recording medium, parts of a relay-recorded content by a simple operation.

According to an aspect of the present invention, there is provided a recording apparatus comprising: first recording means for recording information data on a first recording medium; second recording means for recording the information data on a second recording medium; and control means for controlling the first recording means and the second recording means to record the information data representing a series of contents on the first recording medium and subsequently on the second recording medium, and generate identification information indicating that the information data is divisionally recorded information data which is divisionally recorded on the first recording medium and the second recording medium and record the identification information on the first recording medium and the second recording medium.

According to another aspect of the present invention, there is provided a recording apparatus comprising: first recording means for recording video data on a first recording medium; second recording means for recording the video data on a second recording medium; and control means for controlling the first recording means and the second recording means to record the video data representing a series of contents on the first recording medium and subsequently on the second recording medium, and generate notification video data to notify a user that the video data recorded on the first recording medium is divisionally recorded video data which is divisionally recorded on the first recording medium and the second recording medium and record the notification video data on the first recording medium.

According to a further aspect of the present invention, there is provided a recording apparatus comprising: first recording means for recording video data on a first recording medium; second recording means for recording the video data on a second recording medium; control means for controlling the first recording means and the second recording means to divisionally record the video data representing a series of contents on the first recording medium and the second recording medium; and mode setting means for switching between a first representative image display mode in which representative images of video data of a plurality of contents recorded on the first recording medium are displayed on a single window, and a predetermined icon is displayed near a representative image of the divisionally recorded content of the plurality of contents recorded on the first recording medium, the divisionally recorded content being divisionally recorded on the first recording medium and the second recording medium, and a second representative image display mode in which representative images of video data of a plurality of contents recorded on the second recording medium are displayed on a single window, and a predetermined icon is displayed near a representative image of the divisionally recorded content of the plurality of contents recorded on the second recording medium.

According to yet further aspect of the present invention, there is provided a method of recording information data on a first recording medium and a second recording medium, comprising recording the information data representing a series of contents on the first recording medium and subsequently on the second recording medium, and generating and recording, on the first recording medium and the second recording medium, identification information indicating that the information data is divisionally recorded information data which is divisionally recorded on the first recording medium and the second recording medium.

According to another aspect of the present invention, there is provided a method of recording video data on a first recording medium and a second recording medium, comprising recording the video data representing a series of contents on the first recording medium and subsequently on the second recording medium, and generating and recording, on the first recording medium, notification video data to notify a user that the video data recorded on the first recording medium is divisionally recorded video data which is divisionally recorded on the first recording medium and the second recording medium.

According to another aspect of the present invention, there is provided a method of recording video data on a first recording medium and a second recording medium, comprising divisionally recording the video data representing a series of contents on the first recording medium and the second recording medium, the method having a first representative image display mode in which representative images of video data of a plurality of contents recorded on the first recording medium are displayed on a single window, and a predetermined icon is displayed near a representative image of the divisionally recorded content of the plurality of contents recorded on the first recording medium, the divisionally recorded content being divisionally recorded on the first recording medium and the second recording medium, and a second representative image display mode in which representative images of video data of a plurality of contents recorded on the second recording medium are displayed on a single window, and a predetermined icon is displayed near a representative image of the divisionally recorded content of the plurality of contents recorded on the second recording medium.

According to another aspect of the present invention, there is provided a recording apparatus comprising: first recording means for recording information data on a first recording medium; second recording means for recording the information data on a second recording medium; and control means for controlling the first recording means and the second recording means to divisionally record the information data representing a series of contents on the first recording medium and the second recording medium, and when the first recording medium has obtained a recordable capacity capable of recording the information data divisionally recorded on the second recording medium as a result of delete processing of the information data from the first recording medium, move the information data divisionally recorded on the second recording medium to the first recording medium and record the information data on the first recording medium.

According to an aspect of the present invention, there is provided a method of recording information data on a first recording medium and a second recording medium, comprising divisionally recording the information data representing a series of contents on the first recording medium and the second recording medium, and when the first recording medium has obtained a recordable capacity capable of recording the information data divisionally recorded on the second recording medium as a result of delete processing of the information data from the first recording medium, moving to the first recording medium and recording on the first recording medium, the information data divisionally recorded on the second recording medium.

According to another aspect of the present invention, there is provided a recording apparatus comprising: first recording means for recording information data on a first recording medium; second recording means for recording the information data on a second recording medium; and control means for controlling the first recording means and the second recording means to record the information data representing a series of contents on the first recording medium and subsequently on the second recording medium, and generate identification information indicating that the information data is divisionally recorded information data which is divisionally recorded on the first recording medium and the second recording medium and record the identification information on the first recording medium and the second recording medium, wherein when the first recording medium has obtained a recordable capacity capable of recording the information data divisionally recorded on the second recording medium as a result of delete processing of the information data from the first recording medium, the control means controls the first recording means and the second recording means to move the information data divisionally recorded on the second recording medium to the first recording medium and record the information data on the first recording medium.

Other objects and advantages besides those discussed above shall be apparent to those skilled in the art from the description of a preferred embodiment of the invention which follows. In the description, reference is made to accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 29 is a view showing a state of a content recorded by the apparatus shown in FIG. 27.

DETAILED DESCRIPTION OF THE PREFERRED EMBODIMENTS

Preferred embodiments of the present invention will now be described in detail in accordance with the accompanying drawings.

First Embodiment

Figure 1:
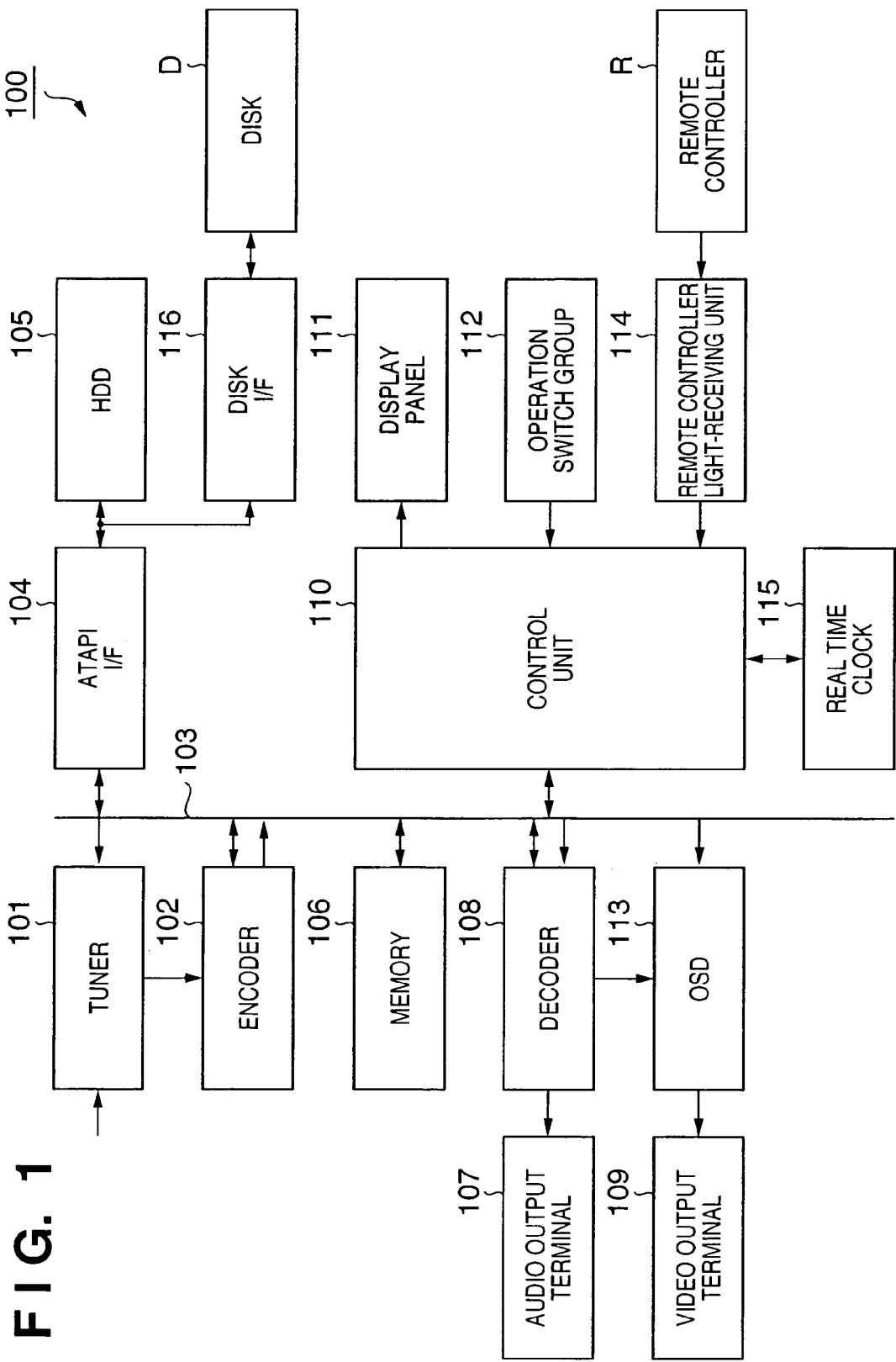
FIG. 1 is a block diagram showing the arrangement of a recording/playback apparatus according to an embodiment.

FIG. 1 is a block diagram showing the arrangement of a recording/playback apparatus 100 according to the first embodiment of the present invention.

A control unit 110 controls the units of the recording/playback apparatus 100. The control unit 110 has at least a microcomputer, a nonvolatile memory (ROM or NVRAM) which stores the program of the microcomputer, a volatile memory (RAM) serving as a work area, an external bus to transmit/receive data to/from another hardware or access a control register, and a timer which counts time.

In addition to the external bus of the control unit 110, blocks to be described later are connected to a bus 103. The bus 103 serves as a transmission line which transmits/receives data under the control of the control unit 110. A tuner 101 selects a channel under the control of the control unit 110 from broadcast waves received through an antenna or a cable and outputs the video signal of the selected channel. In the recording mode, under the control of the control unit 110, an encoder 102 receives the video signal output from the tuner 101 and sequentially converts the signal into digital video data of MPEG (Moving Picture Experts Group).

The digital video data is output, in the address space of the bus 103, from an address designated by the control unit 110. A memory 106 can be used for work by the blocks. Reference numeral 104 denotes an ATA (ATAPI) interface unit 104 (to be referred to as an ATAPI_I/F unit hereinafter); and 105, a hard disk drive (HDD). The ATAPI_I/F unit 104 has an interface to the control unit 110 or memory 106 connected to the bus 103 and an interface to the HDD 105 or a disk I/F 116 as an optical disk drive. The ATAPI_I/F unit 104 executes conversion for access from the control unit 110 to the control register of the HDD 105 or disk I/F 116.

The disk I/F 116 has a mechanical deck including a head and motor, a control circuit which controls them, and an interface connectable to the ATAPI_I/F unit 104. The disk I/F 116 reads/writes data from/on an optical disk D as a detachable recording medium. The ATAPI_I/F unit 104 has a so-called direct memory access (DMA) function which automatically transfers read data or write data when the start address and data amount on the bus 103 and the start sector of the HDD 105 (or the optical disk D) are designated. The optical disk D is loaded/unloaded in/from the recording/playback apparatus 100 by an ejecting mechanism (not shown).

On the other hand, the HDD 105 is incorporated in the recording/playback apparatus 100 so that no general users can easily detach it.

A decoder 108 sequentially reads out digital video data for an address on the bus 103 designated by the control unit 110, converts the data into a video signal and audio signal, and outputs them. Reference numeral 107 denotes an audio output terminal; and 109, a video output terminal. The video output terminal 109 and audio output terminal 107 are terminals to output an NTSC video signal and audio signal converted by the decoder 108 to an external device. These terminals are connected to a TV receiver or the like. An on-screen display (OSD) unit 113 superposes, on a video output, information such as various setting menus, title, and time.

A display panel 111 is arranged on the front surface of the main body to display minimum information. An operation switch group 112 serves as an input unit with which the user powers on the apparatus, selects a recording medium (HDD or optical disk), selects the recording mode or playback mode, or determines the image quality. A remote controller light-receiving unit 114 receives a signal from an infrared remote controller unit R and transmits the signal to the control unit 110 as a pulse. The control unit 110 converts the pulse into data and recognizes it as a control command. The infrared remote controller unit R serves as a user input means like the operation switch group 112. In the following description, the operation of the operation switch group 112 may basically be implemented by operating the infrared remote controller unit R.

A real time clock 115 transmits calendar and time information to the control unit 110. The initial value and count start instruction are input by the user through the operation switch group 112 and given through the control unit 110. For example, the scheduled recording function uses time information generated by the real time clock 115. Time stamp information added to a recorded content also uses this time information.

The control unit 110 has software which handles a predetermined file system. The data read/write from/to the HDD 105 or optical disk D is executed in accordance with the file system. Data from the start of one recording to the end is managed basically as one content. Display of a content list is also done on the basis of this unit of contents.

Examples of switches arranged in the infrared remote controller unit R and operation switch group 112 will be described with reference to FIG. 9.

A power key 901 turns on/off the power supply of the recording/playback apparatus 100. When an HDD selection key 902 is pressed, the HDD 105 is selected as a recording medium for recording/playback. When a disk selection key 903 is pressed, the optical disk D is selected as a recording medium for recording/playback. A recording mode key 904 is used to select the image quality of recording. A record key 905 instructs the start of recording. A stop key 906, pause key 907, and play key 908 instruct corresponding operations. A rewind key 913 and fast-forward key 914 instruct quick scan.

A menu key 909 is used to invoke, e.g., various setting windows. An erase key 910 instructs erase of a content selected on the screen. A cursor key 911 is used in combination with a graphic user interface (GUI) displayed on the TV receiver or the like by the control unit 110 and OSD unit 113. The cursor key 911 is used to move a focus vertically or horizontally. A return key 916 is used to move to the upper layer of the hierarchical menu in the GUI or return to the immediately preceding window. An enter key 917 is used to determine selection of an item selected by the cursor key 911 or instruct execution of an operation. Reference numeral 912 denotes a channel selection key of the tuner 101. A list key 915 is used to display a content selection list.

Figure 9:
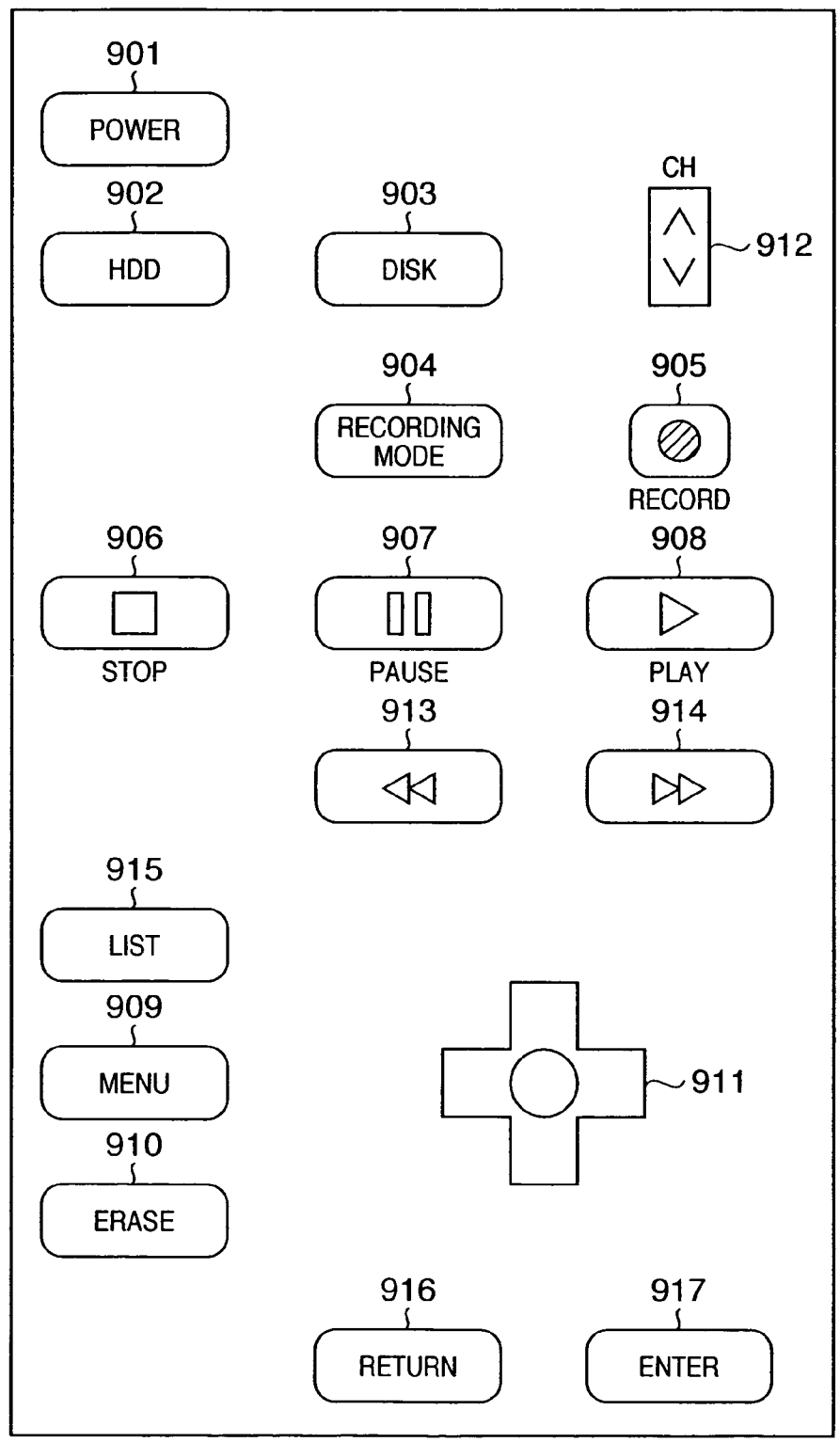
FIG. 9 is a view showing details of an operation switch group.

When the various keys shown in FIG. 9 are arranged on the infrared remote controller unit R, information of a pressed key is transmitted to the control unit 110 through the remote controller light-receiving unit 114 as a predetermined code. The switches described with reference to FIG. 9 are not all switches arranged in the operation switch group 112. Only switches necessary for the description of this embodiment have been described above.

The recording operation will be described next. Assume that the HDD selection key 902 is operated to select the HDD 105 as a recording medium.

When the apparatus is powered on, the control unit 110 searches the HDD 105 for a recordable (free) space on the basis of the above-described file system. The recordable capacity is calculated. The recordable time is calculated on the basis of the recordable capacity and the recording mode (recording image quality) set by the recording mode key 904. During recording, the decrease in recordable capacity is monitored, and the recordable time is updated periodically. On the other hand, the user transmits, to the control unit 110, an operation of selecting a desired channel by using the operation switch group 112. The control unit 110 is always detecting the state of the operation switch group 112 and monitoring the user operation. At this time, the control unit 110 detects the channel selection operation and controls the tuner 101 to change the channel. In the following description, the user operation is transmitted to the control unit 110 through the operation switch group 112, unless otherwise specified.

Next, when the user generates a recording start request, the control unit 110 controls the respective blocks to start recording the selected broadcast program. First, the control unit 110 controls the encoder 102 to start encoding and store digital video data from a predetermined address of the memory 106. Every time a predetermined amount of data is stored, the encoder 102 notifies the control unit 110 of it by a means such as interruption. Upon receiving this notification, the control unit 110 notifies the encoder 102 of the next start address from which the data is to be stored. The control unit 110 also issues a command to the ATAPI_I/F unit 104 to write, in the HDD 105, the digital video data stored in the memory 106 by the encoder 102.

The write area of the HDD 105 at this time is the recordable (free) space searched on the basis of the file system. The series of processing operations from encoding to the write in the HDD 105 are repeated until a recording stop request is generated. In this embodiment, the series of data recorded from the recording start instruction to the recording stop instruction is recorded as one file (content). In addition, management information including the content recording time, recording date/time, channel, title, and information necessary for special playback is added as the header (or footer) of the file. Alternatively, a content management file is generated and recorded in the HDD 105.

The playback operation will be described next. In this case as well, the user operates the operation switch group 112 to select the content to be played back. The content list or representative images (thumbnails) associated with contents are displayed (this window will be referred to as a content selection window hereinafter). The pointer is moved to a desired content, and the enter key is pressed to start playback. This sequence is generally used. Alternatively, for example, the first content, a continuation of a precedingly played content, or the content recorded latest may be played back by directly pressing a play key (or a key assigned to issue a playback instruction).

The control unit 110 reads out the digital video data of the thus determined content from the HDD 105. More specifically, the control unit 110 issues a command to the ATAPI_I/F unit 104 to read out the data from the HDD 105 and store it in the memory 106 as the reverse to recording. As in the recording mode, the read start sector of the HDD 105, the write start address of the memory 106, and the data amount are designated by the control unit 110. Next, the control unit 110 issues a command to the decoder 108 to decode the digital video data stored in the memory 106. The series of processing operations are repeatedly executed such that digital video data to be decoded is continuously supplied to the decoder 108 until the content comes to the end, or a user operation such as stop or pause is input.

An example of the content selection window will be described with reference to FIG. 2. A display window 201 is output from the video output terminal 109 and displayed on a TV receiver or the like. Reference numerals 203 to 208 denote representative images of contents. A selection frame 211 is displayed to notify the user of the selected content. The user sequentially moves the selection frame 211 by the key operation. When the selection frame 211 is moved to a desired content, and playback is instructed, playback of the desired content starts. Pieces of information such as the recording date, title, and recording mode of the contents may also be displayed, although they are not illustrated in FIG. 2.

The recording and playback operations described above also apply to recording and playback of the optical disk D.

Copy or movement of data between the HDD 105 and the optical disk D can also be done under the control of the control unit 110.

The recording operation as a characteristic feature of the present invention will be described next with reference to the flowchart shown in FIG. 4. When the recording operation starts as, e.g., the user presses the record key, it is determined whether the optical disk D is selected as a recording medium (S401). If not the optical disk D but the HDD 105 is selected, the recording processing in the HDD 105 is executed until the recording stop instruction is generated, as described above (S405).

If the optical disk D is selected, recording on the optical disk D is started, like recording in the HDD 105 (S402). While executing recording on the optical disk D, it is determined whether the recordable time of the optical disk D has a predetermined value or more (S403). If YES in step S403, it is determined whether the recording stop instruction is generated by the user operation (S404). If YES in step S404, the control by the flowchart is ended.

If NO in step S403, data recording in the HDD 105 is started (S405b). The processing contents are almost the same as in step S405 except that recording on the optical disk D is stopped a predetermined time after the start of recording in the HDD 105. In addition, data recording in the HDD 105 in step S405b is also ended when the recording stop instruction is generated by the user.

With the processing in step S405b, data immediately before the stop of recording on the optical disk D is also commonly recorded in the HDD 105. After the stop of recording on the optical disk D, the data is continuously recorded in the HDD 105. This operation will be referred to as a relay operation hereinafter. In relay recording, a predetermined section near the switching portion from the optical disk D to the HDD 105 is recorded in both recording media. This section recorded in both recording media will be referred to as a redundant region/period.

When the recording stop instruction is generated after relay recording, the remaining capacity of the optical disk D is compared with the data amount relay-recorded in the HDD 105 (S408). The data amount relay-recorded in the HDD 105 is obtained by subtracting the redundant region/period from the content newly recorded in the HDD 105.

If the remaining capacity of the optical disk D is larger than the data amount relay-recorded in the HDD 105, the data relay-recorded in the HDD 105 is moved to the optical disk D. More specifically, if the remaining capacity of the disk is larger in step S406, it indicates that even when the data was continuously recorded on the optical disk D, the data could wholly be recorded on the optical disk D, although it was relay-recorded in the HDD 105 in fact. The data relay-recorded in the HDD 105 is moved to the optical disk D, and the two data are coupled as one file.

In this case, however, coupling is done after the redundant region/period in one recording medium is deleted. Coupling is processing for adding the data to the file recorded on the optical disk D, i.e., two divided streams are time-serially connected into one file. Accordingly, the management file of the disk D is simultaneously updated.

On the other hand, if the remaining capacity of the optical disk D is smaller than the data amount relay-recorded in the HDD 105 in step S406, relay recording management information to manage the content (relay content) recorded over the optical disk D and HDD 105 is generated and recorded in the HDD 105 and disk D (S407). The relay recording management information may be described in the above-described content management file. The control unit 110 must specify a specific one of a plurality of optical disks, i.e., the disk on which the content associated with the relay recording management information is recorded. For this purpose, a code to identify the relay-recorded content and the relay recording management information associated with it is added to the content management information or content file recorded on the optical disk and recorded.

The relay recording management information will be described here with reference to FIG. 3.

Figure 3:
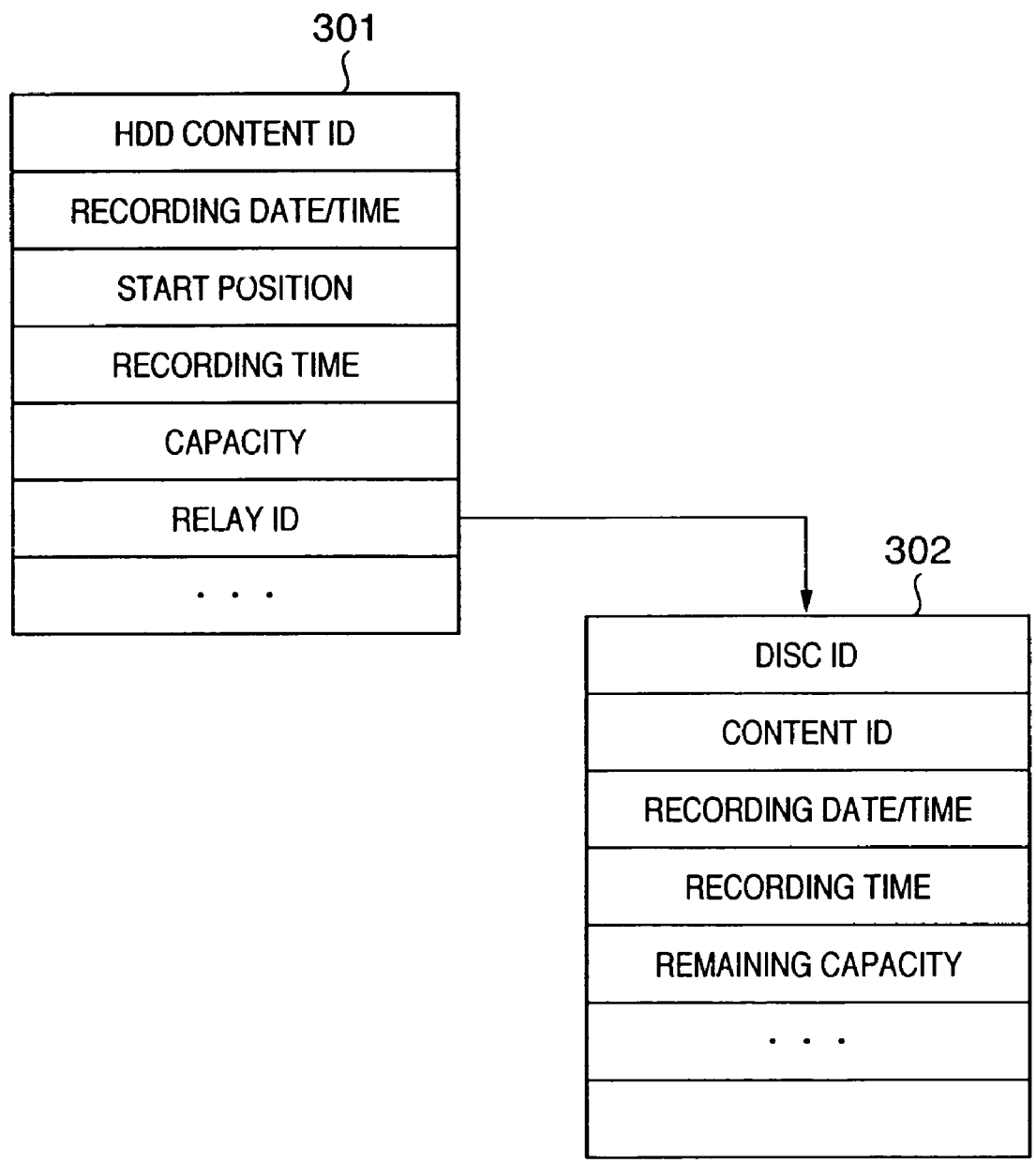
FIG. 3 is a view for explaining the structure of content management information.

FIG. 3 shows an example of relay recording management information recorded in the HDD 105. In HDD content management data 301, items such as an HDD content ID, recording date/time, start position, recording time, and capacity are related to a part recorded in the HDD 105. A relay ID is added only when there is a relay-recorded content. If no relay-recorded content is present, for example, "0" is written. The control unit 110 generates and records the relay recording management information for each content file recorded in the HDD 105.

Reference numeral 302 denotes identification data (to be referred to as relay recording disk part information hereinafter) associated with a relay-recorded content recorded on the optical disk D. A DISC_ID is unique information added to each optical disk. All pieces of information such as a content ID, recording date/time, recording time, and remaining capacity are associated with the optical disk. The relay recording disk part information 302 is associated by the relay ID. The control unit 110 generates the relay recording disk part information 302 for each relay-recorded content file recorded in the HDD 105 and records the information 302 in a predetermined area of the HDD 105. In addition, the control unit 110 records the same information for each relay-recorded content file recorded on the optical disk D.

When the relay recording management information recorded in the HDD 105 is compared with the relay recording disk part information 302 recorded on the optical disk D, relay-recorded contents recorded on the optical disk D and HDD 105 can be made to correspond to each other.

The DISC_ID is information added by the system when the optical disk D is inserted to the main body for the first time or formatted. When individual IDs are written on all disks by the standard, or each disk has an identification means such as a radio ID tag, that ID may be used.

Figure 5:
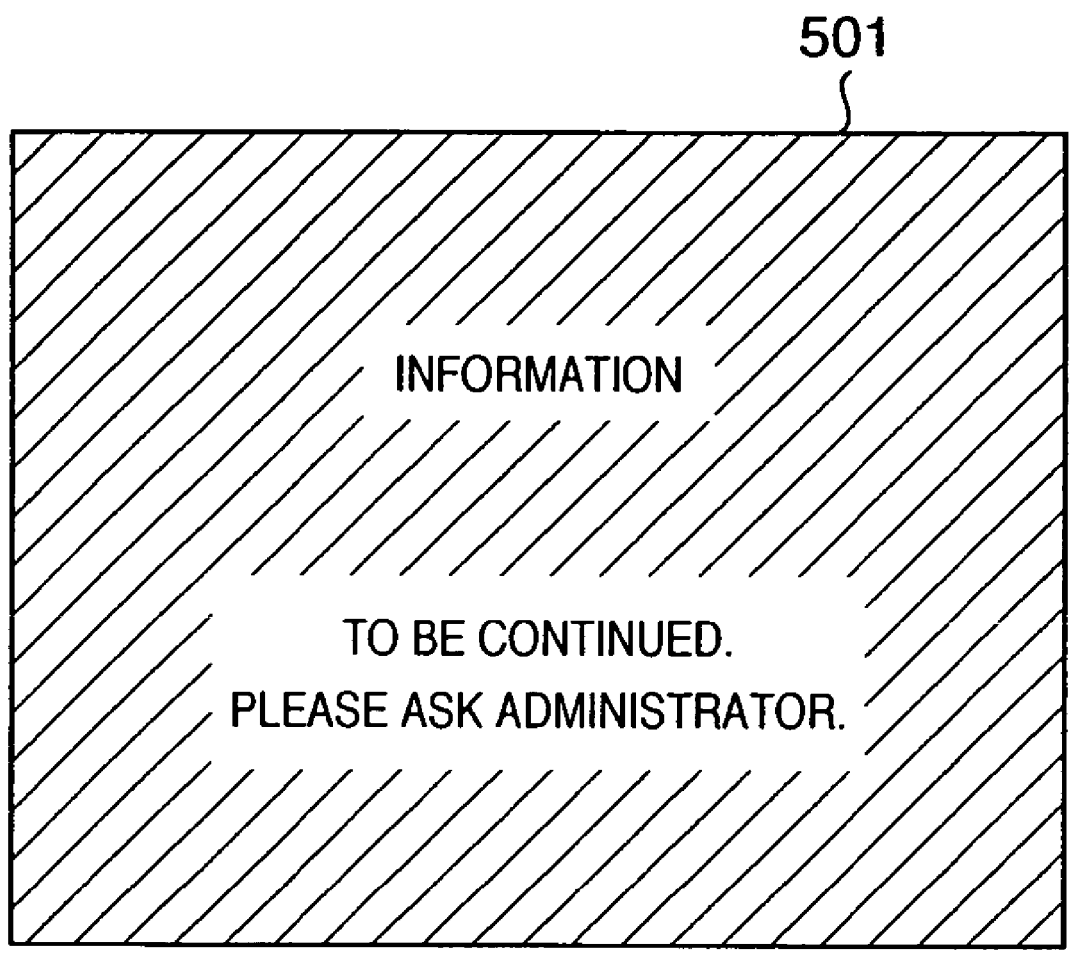
FIG. 5 is a view showing a message information window recorded on an optical disk in the relay recording mode.

For the last content recorded on the optical disk, message information that notifies the user that remaining data is separately relay-recorded is generated and recorded on the disk D. For example, video data to play back a video image as shown in FIG. 5 for a predetermined time is recorded. This video data is compressed by the same method as that of the encoder 102. Alternatively, the data is compressed in advance and recorded in the ROM as a program in the control unit, or recorded in the HDD 105 at the time of manufacture.

Figure 4:
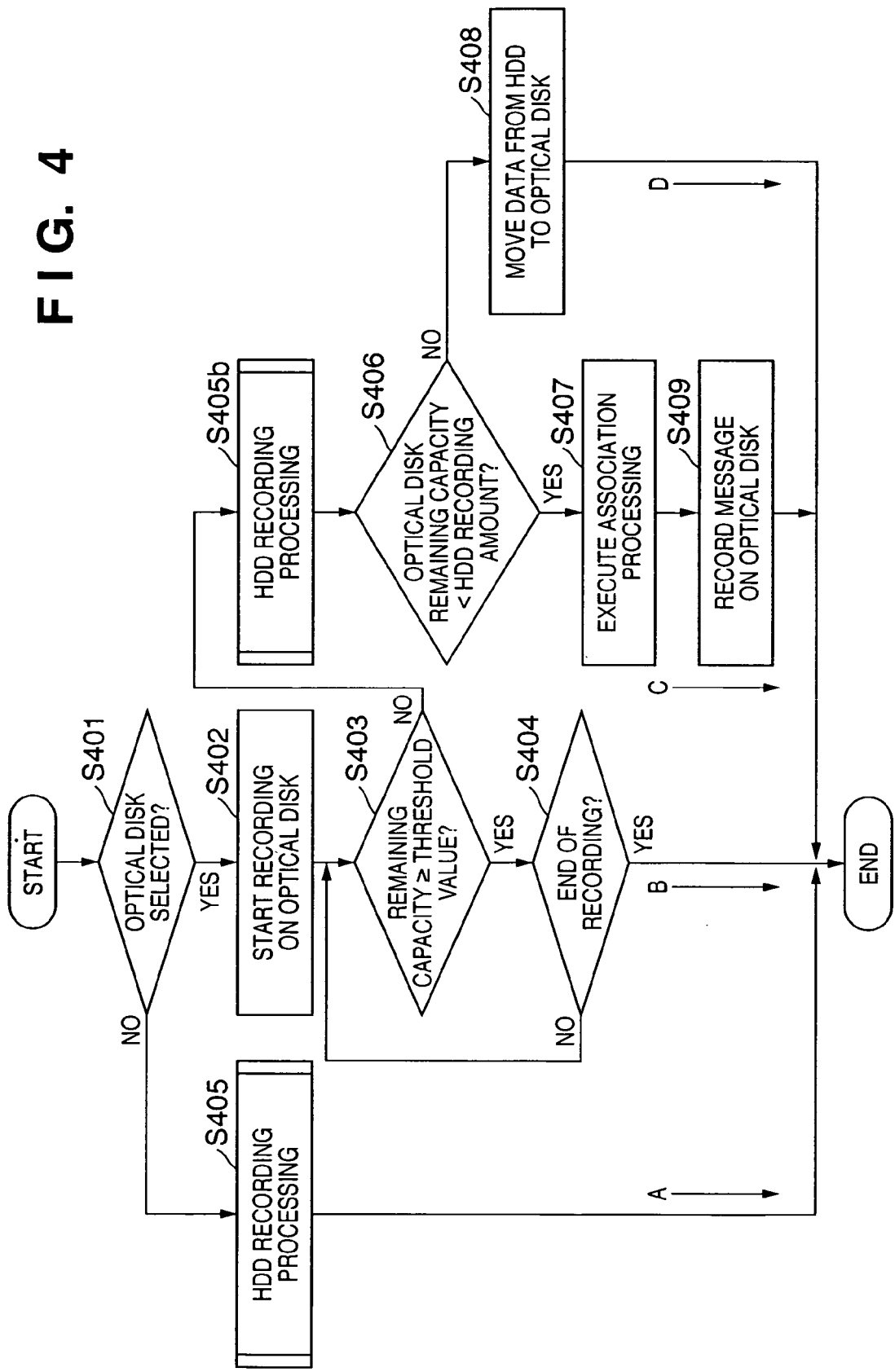
FIG. 4 is a flowchart for explaining processing in the relay recording mode.

When the control of the flowchart shown in FIG. 4 described above is executed, relay recording can be executed. In addition, even when only the data recorded on the optical disk D is played back by another device, the user can know that the relay-recorded content is present.

The state of a content recorded on the basis of the flowchart shown in FIG. 4 will be described next with reference to FIG. 6.

Figure 6:
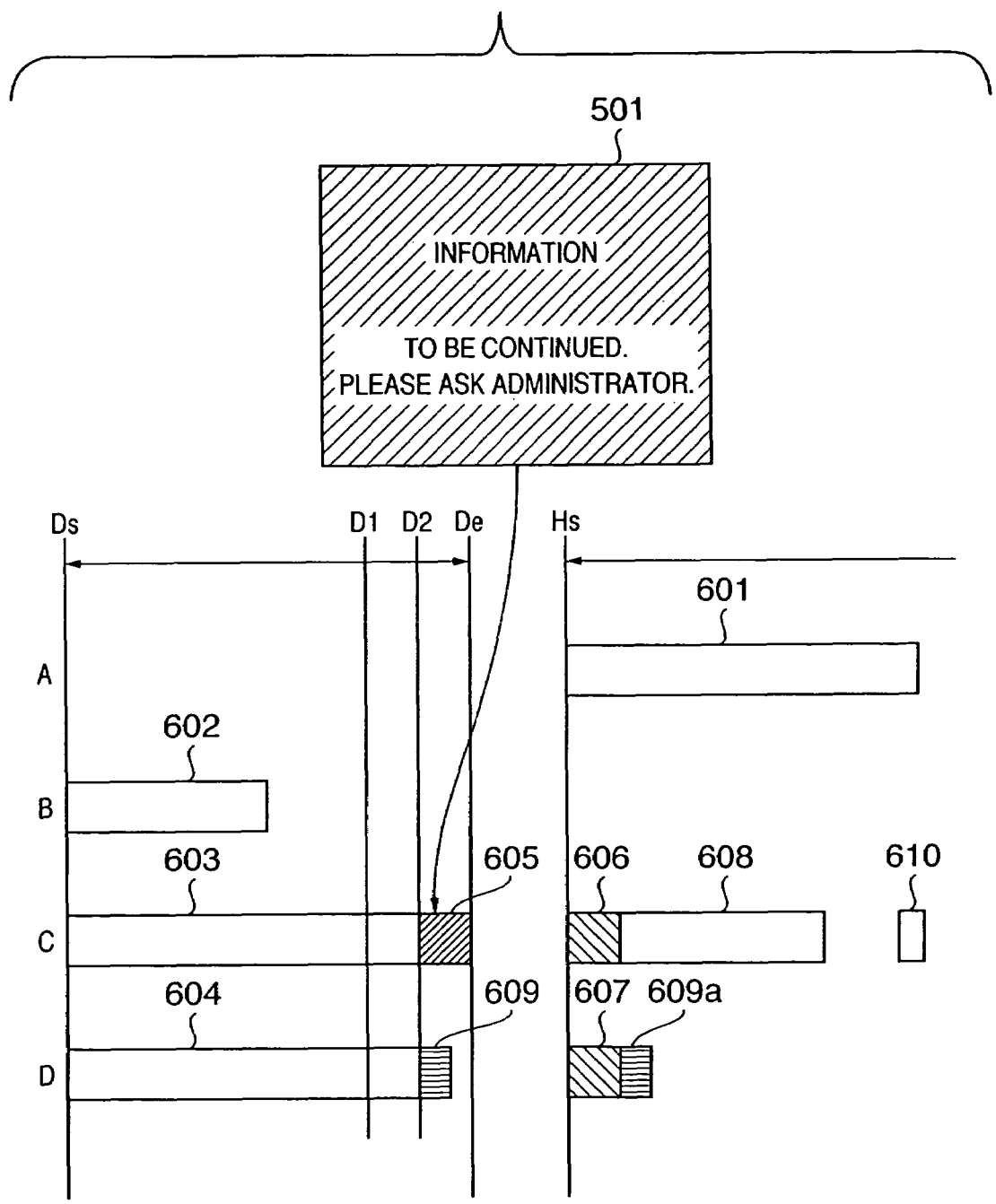
FIG. 6 is a view showing the state of a content recorded on an optical disk and HDD.

Referring to FIG. 6, the abscissa represents the capacity of video data. An amount from Ds to De indicates a maximum video data amount recordable on the optical disk D. An amount from D1 to De corresponds to a remaining capacity threshold value to determine in step S403 whether to execute relay recording. A capacity from D2 to De is necessary for recording the video data shown in FIG. 5. The right side of Hs indicates data recorded in the HDD 105. A, B, C, and D indicate examples of the amounts and arrangements of video data recorded according to arrows A to D in the flowchart show in FIG. 4. Reference numerals 601 to 609 denote states of recorded video data. They will be expressed as, e.g., video data 601. Reference numeral 610 denotes relay recording management information.

In the state A shown in FIG. 6, since the HDD 105 is selected as a recording medium, no data is recorded on the optical disk D. In the state B, since recording is stopped before there will be a shortage of the capacity of the optical disk D, no relay recording in the HDD 105 is executed.

In the state C, relay recording occurs. When the remaining capacity of the disk D becomes smaller than D1 during recording of the video data 603, the processing advances from step S403 to step S405b to start recording in the HDD 105 so that the video data 606 and 608 are recorded. When recording of the video data 603 continues, and the remaining capacity reaches D2, recording on the optical disk D is stopped. The data in the section from D1 to D2 of the video data 603 and the video data 606 recorded in the HDD 105 are recorded simultaneously and contain identical video streams (these portions correspond to the above-described redundant region/period). The video data 605 described with reference to FIG. 5 is recorded after the end of recording, as described above. The video data 606 and 608 are separated for the descriptive convenience. Actually, these data are recorded in the HDD 105 as one content (file).

In the state D, the video data is temporarily relay-recorded in the HDD 105. However, the remaining capacity of the optical disk D is larger than data 609a relay-recorded in the HDD 105. That is,

|(D2−De)|≧amount of video data 609a

For this reason, the video data 609a temporarily relay-recorded in the HDD 105 is moved to the disk D and recorded as the video data 609. As described above, the video data 604 and 609 are recorded as one content. As a result, the data is different from the pattern B only in the capacity. After movement, the video data 607 and 609a are deleted from the HDD 105.

Processing in the playback mode will be described next.

In this embodiment, a case will be described, in which one of the optical disk D and HDD 105 is selected, and one of contents recorded in the selected medium is selected and played back.

Figure 7:
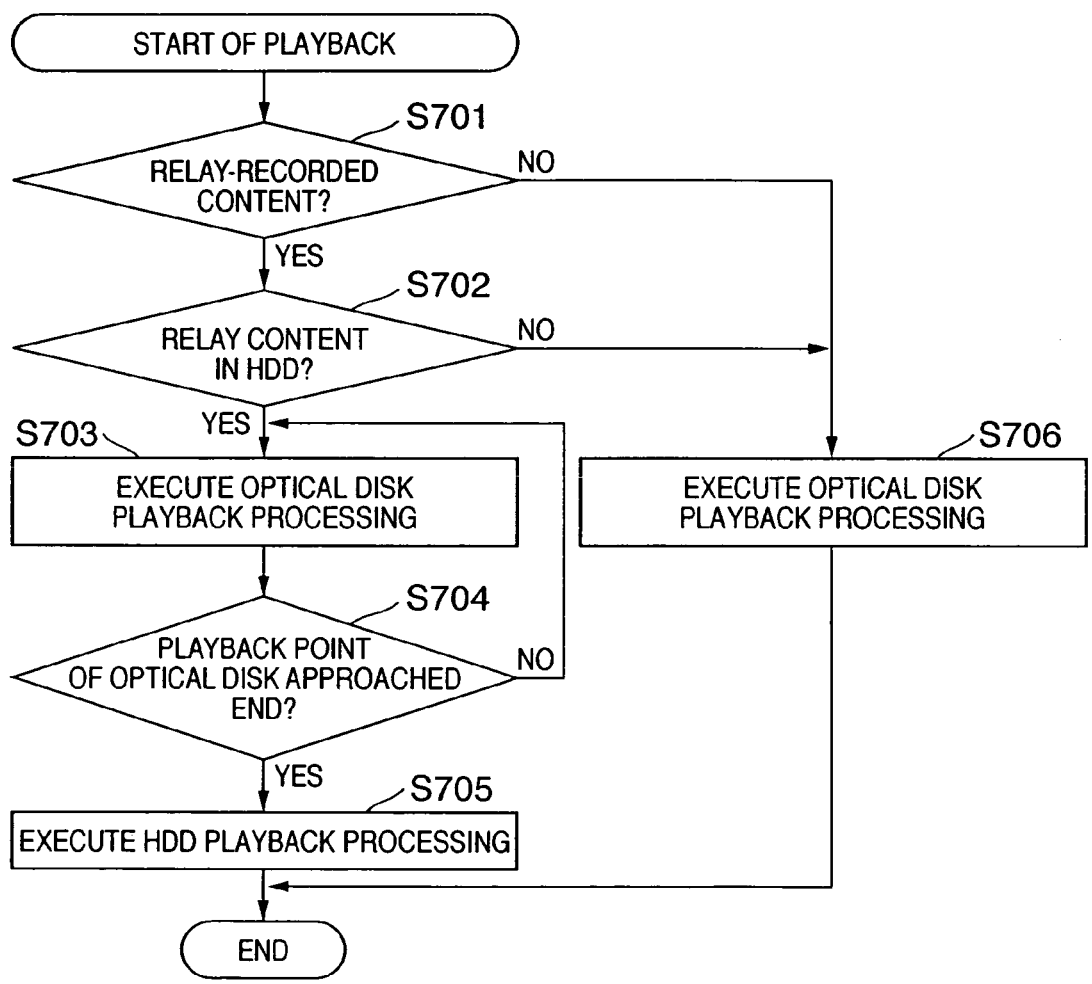
FIG. 7 is a flowchart showing processing in the playback mode.

First, the playback operation when the optical disk D is selected by the user operation will be described with reference to the flowchart shown in FIG. 7. When one of contents recorded on the disk D is selected, and playback is instructed, it is determined on the basis of the above-described relay recording management information whether the playback-instructed content is a relay-recorded content (S701). If YES in step S701, the relay ID of the relay recording disk part information 302 recorded in the HDD 105 is compared with the relay ID of the relay recording management information played back from the disk D, thereby determining whether a content corresponding to the playback-instructed content is recorded in the HDD 105 (S702).

If YES in step S702, playback of the content selected from the optical disk D is executed (S703). It is determined whether the playback point of the content recorded on the optical disk D has approached the end (S704). More specifically, it is determined in the state C in FIG. 6 whether the video data 603 is played back to D1. When the video data is played back to D1, playback of the relay-recorded content recorded in the HDD 105 is started on the basis of the relay recording disk part information 302 (S705).

During the period in which the data from D1 to D2 in the video data 603 shown in FIG. 6 is being played back, the decoder 108 and OSD 113 are controlled to switch the video signal output from the video output terminal 109 and the audio signal output from the audio output terminal 107 to the signals obtained from the playback data from the HDD 105, and playback of the optical disk D is stopped. At this time, the message window shown in FIG. 5 which is recorded as the data 605 in FIG. 6 is not played back, as a matter of course.

After that, the remaining part of the relay-recorded content recorded in the HDD 105 is played back.

If NO in step S701 or S702, no relay-recorded content is present, or the content is no self-recorded content. Hence, normal playback is executed in step S706, and the control is ended.

When the playback-instructed content is a relay-recorded content recorded by another apparatus, i.e., when the processing advances from step S702, the message window shown in FIG. 5 is played back at the end of playback of the content of the optical disk D. Hence, the user can easily understand that the continuation of the content is present in another apparatus.

Even when the relay-recorded content recorded on the disk D is played back by an apparatus having no relay recording function described above, the message window shown in FIG. 5 is displayed. Hence, the user can easily recognize that a continuation is present.

Figure 8:
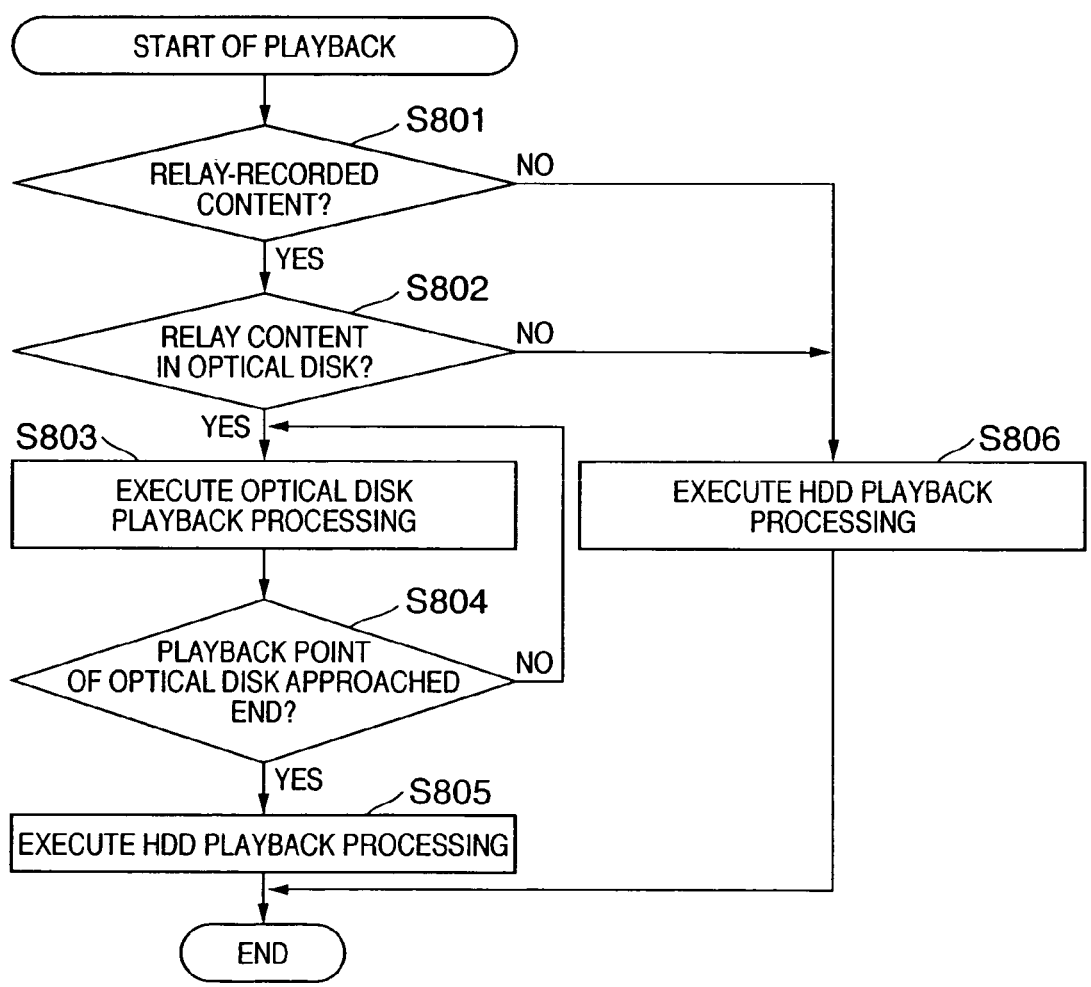
FIG. 8 is a flowchart showing processing in the playback mode.

Next, the playback operation when the HDD 105 is selected will be described with reference to the flowchart shown in FIG. 8.

When one of contents recorded in the HDD 105 is selected, and playback is instructed, it is determined on the basis of the above-described relay recording management information whether the playback-instructed content is a relay-recorded content (S801).

If YES in step S801, the relay ID of the relay recording disk part information 302 recorded in the HDD 105 is compared with the relay ID of the relay recording management information played back from the disk D, thereby determining whether a content corresponding to the playback-instructed content is recorded on the optical disk D (S802).

If YES in step S802, the corresponding relay-recorded content recorded on the optical disk D is detected on the basis of the relay recording management information shown in FIG. 3, and the relay-recorded content is played back from the optical disk D (S803). It is determined whether the content recorded on the optical disk D has approached the end (S804). More specifically, it is determined in the state C in FIG. 6 whether the video data 603 is played back to D1. When the video data is played back to D1, playback of the relay-recorded content recorded in the HDD 105 is started (S805).

During the period in which the data from D1 to D2 in the video data 603 shown in FIG. 6 is being played back, the decoder 108 and OSD 113 are controlled to switch the video signal output from the video output terminal 109 and the audio signal output from the audio output terminal 107 to the signals obtained from the playback data from the HDD 105, and playback of the optical disk D is stopped. At this time, the message window shown in FIG. 5 which is recorded as the data 605 in FIG. 6 is not played back, as a matter of course.

After that, the remaining part of the relay-recorded content recorded in the HDD 105 is played back.

If NO in step S801 or S802, no relay-recorded content is present, or the content is no self-recorded content. Hence, normal playback is executed in step S806, and the control is ended.

When the playback-instructed content is a relay-recorded content, and no optical disk D is inserted, or the inserted optical disk D is not the optical disk on which the corresponding relay content is recorded, i.e., when the processing advances from step S802, message window similar to that shown in FIG. 5 (a window representing that a preceding part is present) may be played back at the start of playback of the content of the HDD 105. In this case, the user can easily understand that the beginning part of the content is present on the optical disk D.

The user can appreciate the relay content continuously from the beginning part by inserting the appropriate optical disk D.

When the relay-recorded content is played back by the apparatus which has relay-recorded that content (self recording/playback), and the corresponding relay-recorded contents are recorded on the optical disk D and HDD 105, the user can continuously appreciate the data relay-recorded from the optical disk D to the HDD 105 only by instructing playback, independently of the selected medium, i.e., the optical disk D or HDD 105.

As described above, according to this embodiment, when backup recording (relay recording) is executed, during recording on a detachable optical disk, for an internal bulk recording medium such as a hard disk due to, e.g., the shortage of the capacity, information of a message window representing that relay recording has been performed is additionally recorded at the end of the relay-recorded content recorded on the optical disk. For this reason, even when the relay-recorded content recorded on the optical disk is played back by another apparatus, the user can know that the continuation of the content is recorded in the recording apparatus.

In this embodiment, when relay recording is done, pieces of identification information to make the relay-recorded contents correspond to each other are recorded on the optical disk and HDD. In the playback mode, the relay-recorded contents recorded on the optical disk and HDD are automatically continuously played back in accordance with the identification information. Hence, the user can easily watch even the content recorded in the HDD only by selecting and playing back a desired content recorded on the optical disk.

In this embodiment, when relay recording has occurred, the message window shown in FIG. 5 is recorded such that it is displayed after the relay-recorded content on the optical disk is played back. However, the present invention is not limited to this. The information may be recorded as management information. In this case, however, the meaning of the information must be defined in advance such that compatibility between devices can be maintained.

Alternatively, in place of video data of the message window, voice data to notify the user that the content is a relay-recorded content may be encoded and recorded on the optical disk. After the relay-recorded content on the optical disk is played back, the message voice data may be played back.

Second Embodiment

The second embodiment of the present invention will be described next.

Figure 10:
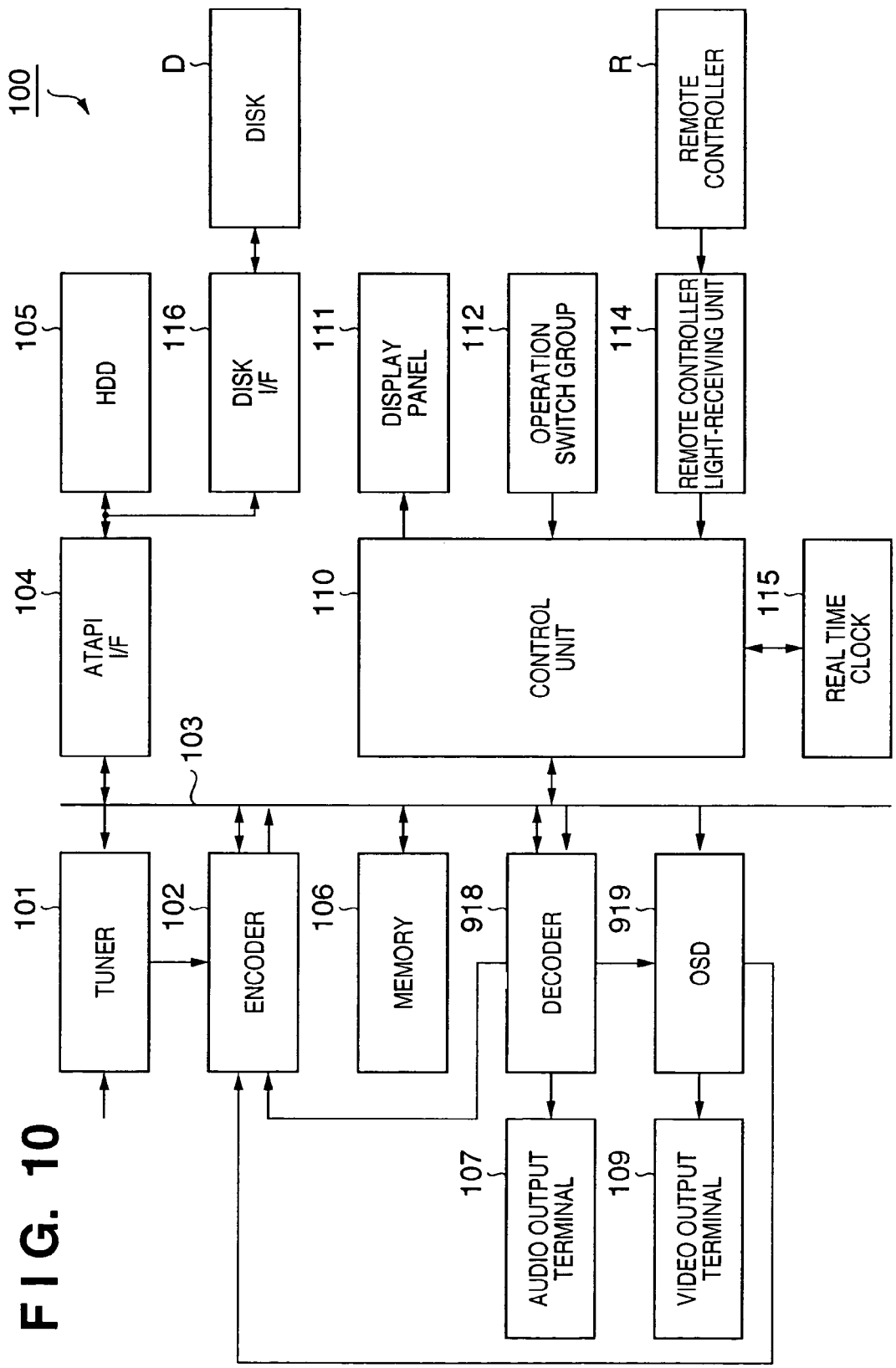
FIG. 10 is a block diagram showing the arrangement of a recording/playback apparatus according to another embodiment.

FIG. 10 is a block diagram showing the arrangement of an image recording/playback apparatus according to the second embodiment. The same reference numerals as in FIG. 1 denote the same blocks in FIG. 10, and a description thereof will be omitted. An encoder 102 receives video data from a tuner 101 and sequentially converts the data into digital video data of MPEG (Moving Picture Experts Group) under the control of a control unit 110. The apparatus also comprises an interface to receive an audio signal from a decoder 918 (to be described later) and a video signal from an OSD unit 919. The signals can also be converted into MPEG data. The decoder 918 sequentially reads out MPEG data from an address on a bus 103 designated by the control unit 110, decodes the data, and outputs it. The on-screen display (OSD) unit 919 superposes bitmap data on digital video data from the tuner 101. The decoder 918 and OSD unit 919 are designated to be able to output the signals even to an encoder 102.

In the arrangement shown in FIG. 10, a bitmap window designated by the control unit 110 is generated by the OSD unit 919 and output to the encoder 102. Accordingly, the bitmap window can be encoded into MPEG data and recorded in an HDD 105 or optical disk D.

In the first embodiment, the message information window of relay recording, which is recorded on the optical disk D, is permanent. In the second embodiment, however, message information which appropriately changes can be created.

Figure 11:
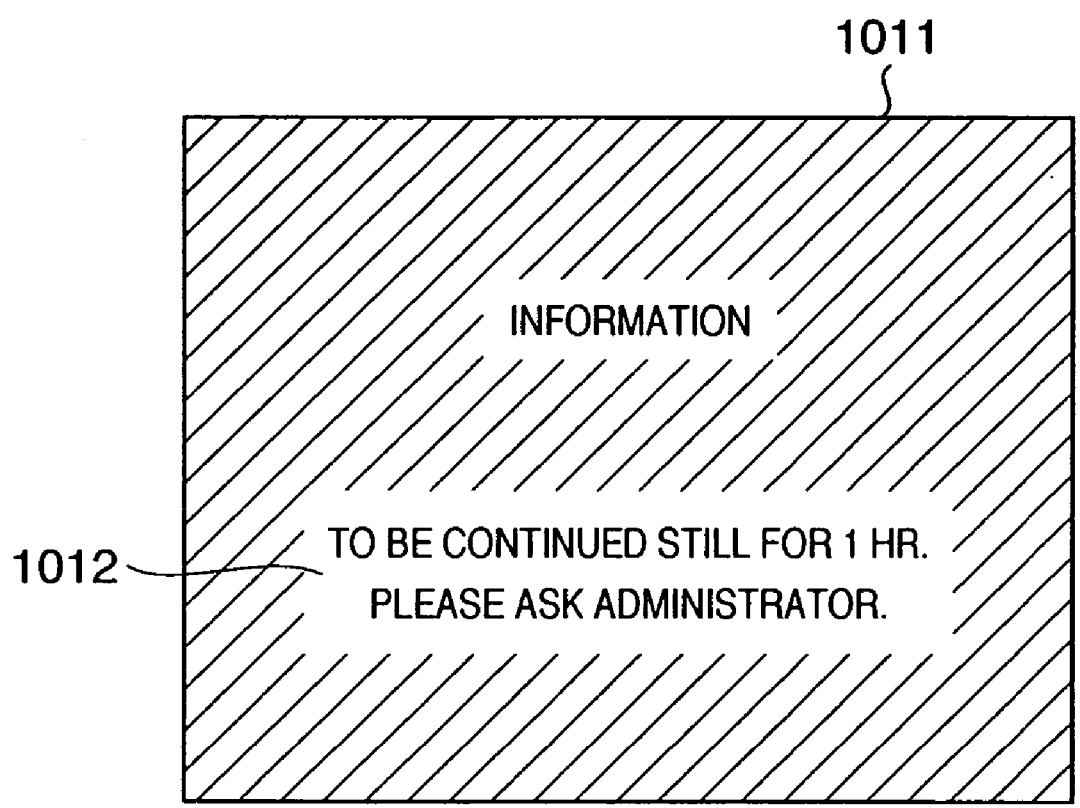
FIG. 11 is a view showing a message information window recorded on an optical disk in the relay recording mode.

In this embodiment, the relay recording information shown in FIG. 5 is changed as shown in FIG. 11.

A window 1011 is generated by the OSD unit 919 under the control of the control unit 110. This window is compression-coded by the encoder 102 and recorded on the optical disk D such that the information is played back at the end of playback of a relay-recorded content. An information message 1012 is different from that shown in FIG. 5 in that a changeable character string, i.e., "1 hr" is added. This "1 hr" is the time of relay recording in the HDD 105. That is, in this embodiment, when relay recording in the HDD 105 is ended, the playback time of the relay-recorded content recorded in the HDD 105 is detected, and the message window is generated on the basis of the playback time information.

The "administrator" may be replaced with a character string registered in the apparatus in advance, and for example, the name or nickname of the owner, or his/her location where to make contact. Image or audio data in the recording area of the HDD may be used as the background.

Similarly, a message representing the presence of the first half of the content may be generated by detecting the length of the part recorded on the optical disk D.

As described above, according to the second embodiment, when an relay-recorded optical disk is played back by another apparatus, the user can obtain more accurate information of the remaining part. Even when a playback instruction for a content recorded in the HDD 105 is input without inserting the optical disk D with the first half, the user can know the time of the first half recorded on the optical disk D.

Third Embodiment

The third embodiment of the present invention will be described next.

In this embodiment, the user can recognize a relay content when he/she selects a content to be played back from the list of thumbnails as representative images of contents recorded on an optical disk D or HDD 105. To do this, in this embodiment, an icon which indicates a relay content is displayed.

Figure 12:
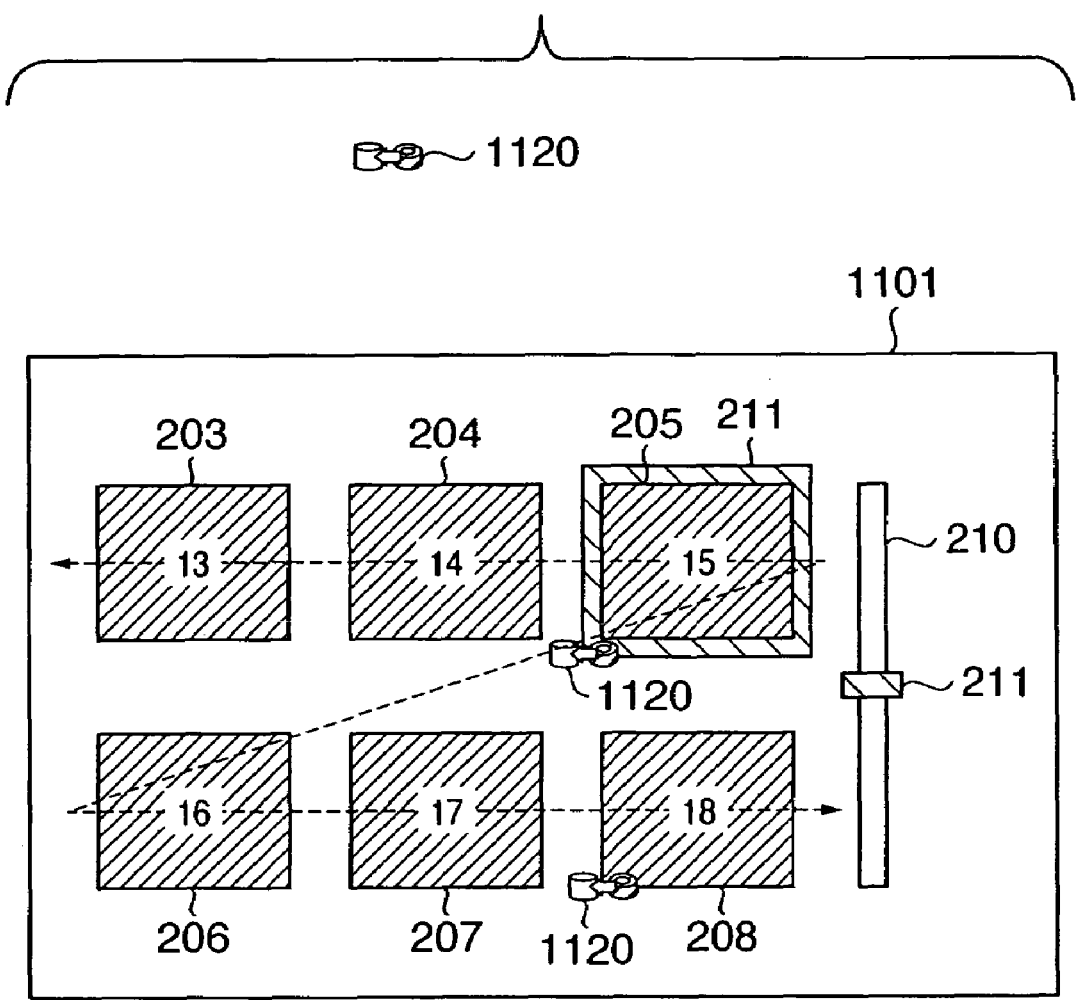
FIG. 12 is a view showing a display example of a content selection window in the playback mode.

Referring to FIG. 12, reference numeral 1101 denotes an example of a content selection window of this embodiment. In the thumbnail list display window, an icon 1120 is displayed near the thumbnail of a content which a control unit 110 determines as a relay-recorded content. Hence, in the example shown in FIG. 12, the icons 1120 displayed on representative images 205 and 208 visually indicate that the contents corresponding to these thumbnails are relay-recorded contents. The icon 1120 is displayed independently of the recording medium selected for playback, i.e., the HDD 105 or optical disk D.

More specifically, when the HDD 105 is selected, and the thumbnail list window display instruction is input, the representative images of contents recorded in the HDD 105 are displayed in a list, as shown in FIG. 12. In addition, the icons 1120 are displayed near the representative images of relay-recorded contents on the basis of relay recording management information. On the other hand, when the optical disk D is selected, and the thumbnail list window display instruction is input, similarly, the representative images of contents recorded on the optical disk D are displayed in a list, as shown in FIG. 12. In addition, the icons 1120 are displayed near the representative images of relay-recorded contents on the basis of relay recording management information.

When, e.g., the HDD 105 is selected, and the icon 1120 is displayed, the user can know that the start portion of the content is not recorded in the HDD 105. When the optical disk D is selected, the user can know before playback that the relay-recorded content cannot be watched to the end unless in self recording/playback. When the optical disk is not a self recording/playback disk, or the optical disk D having the start portion is not inserted, the color or shape of the icon 1120 may be changed.

As described above, according to this embodiment, the user can know in selecting a content to be played back whether it is a relay-recorded content and prepare an appropriate optical disk in advance.

In addition, if first half data corresponding to a relay-recorded content recorded in the HDD is not recorded on the currently inserted optical disk, or no optical disk D is inserted, the control unit 110 may control the OSD unit to generate and output a message window to notify the user that the designated content is a relay-recorded content, and the first half data is recorded on another optical disk.

At this time, if the inserted optical disk is not the medium on which the first half of the selected content is recorded, the user may be notified to exchange the medium.

Fourth Embodiment

As described above, when relay recording is executed, and after the end of recording, a necessary free space can be ensured on the optical disk, the relay-recorded content, i.e., the content data of the part recorded in an HDD 105 in the sequence C in FIG. 4 or 6 can be moved to the optical disk and coupled with the first half data.

To do this, the user creates the free space on the optical disk (rewritable disk) by using an editing function such as a content erase to erase each content or a partial erase to erase part of a content. The content erase is executed by moving a selection frame 211 to a content to be erased on the content selection window shown in FIG. 2 and pressing an erase key 910. The erase key 910 may be pressed during playback of the content to be erased.

The partial erase will be described next.

Figure 13:
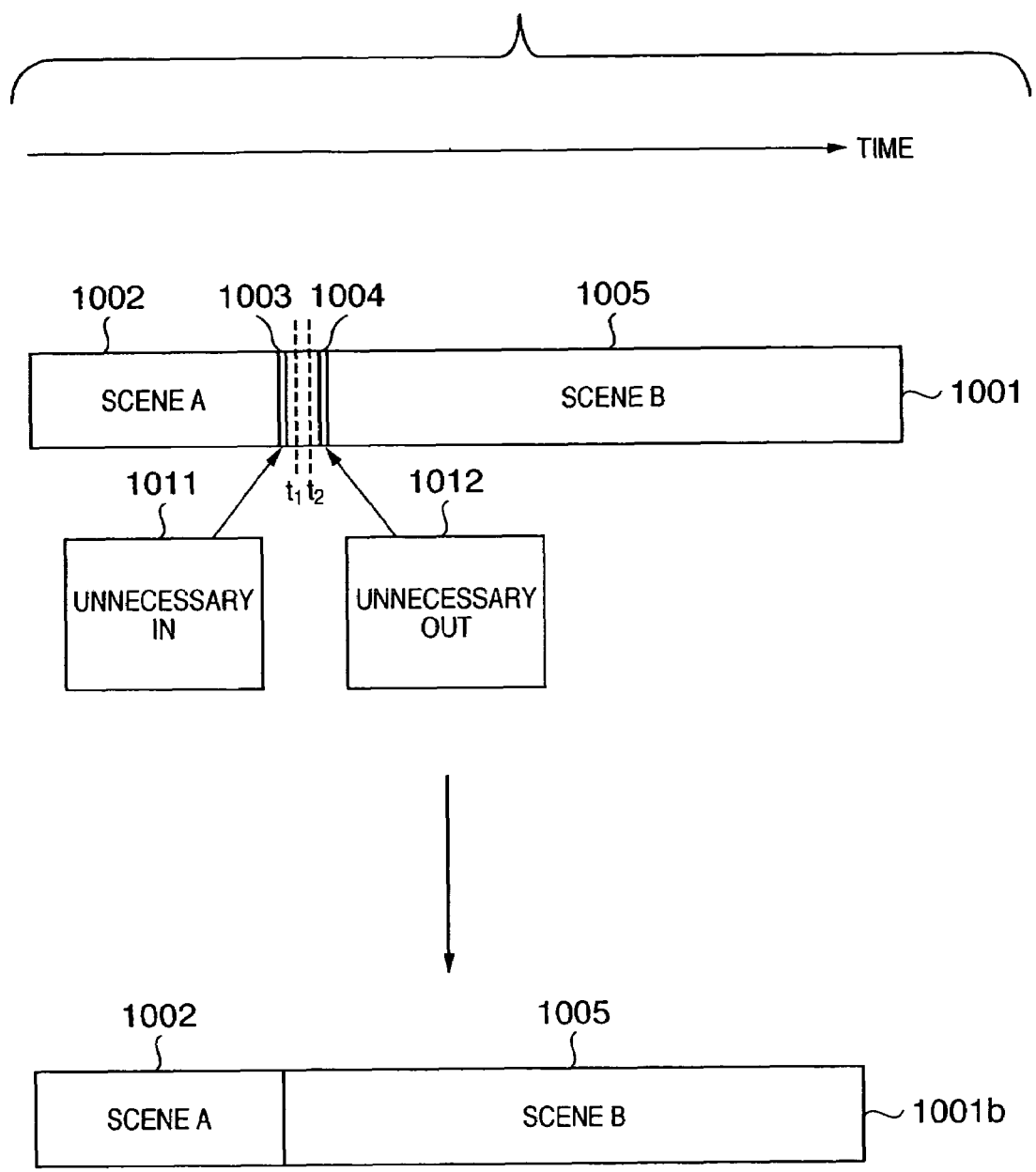
FIG. 13 is a view showing a state of a partial erase.

FIG. 13 shows an image of a content, like FIG. 6. The abscissa represents time. Reference numeral 1001 denotes a sequence of a content. Time elapses from left to right. Reference numeral 1002 denotes a first scene of the content 1001 which will be referred to as a scene A here; 1003, an unnecessary IN point; and 1004, an unnecessary OUT point. A region from the unnecessary IN point 1003 to the unnecessary OUT point 1004 is assumed to be a region containing, e.g., CM which the user wants to erase.

Reference numeral 1005 denotes a scene B of the content 1001; 1011, a video image of the unnecessary IN point 1003; and 1012, a video image of the unnecessary OUT point 1004. After execution of the partial erase, the content containing only the scene A 1002 and scene B 1005 remains on an optical disk D, as indicated by 1001b.

A user interface to implement this operation will be described.

Figure 2:
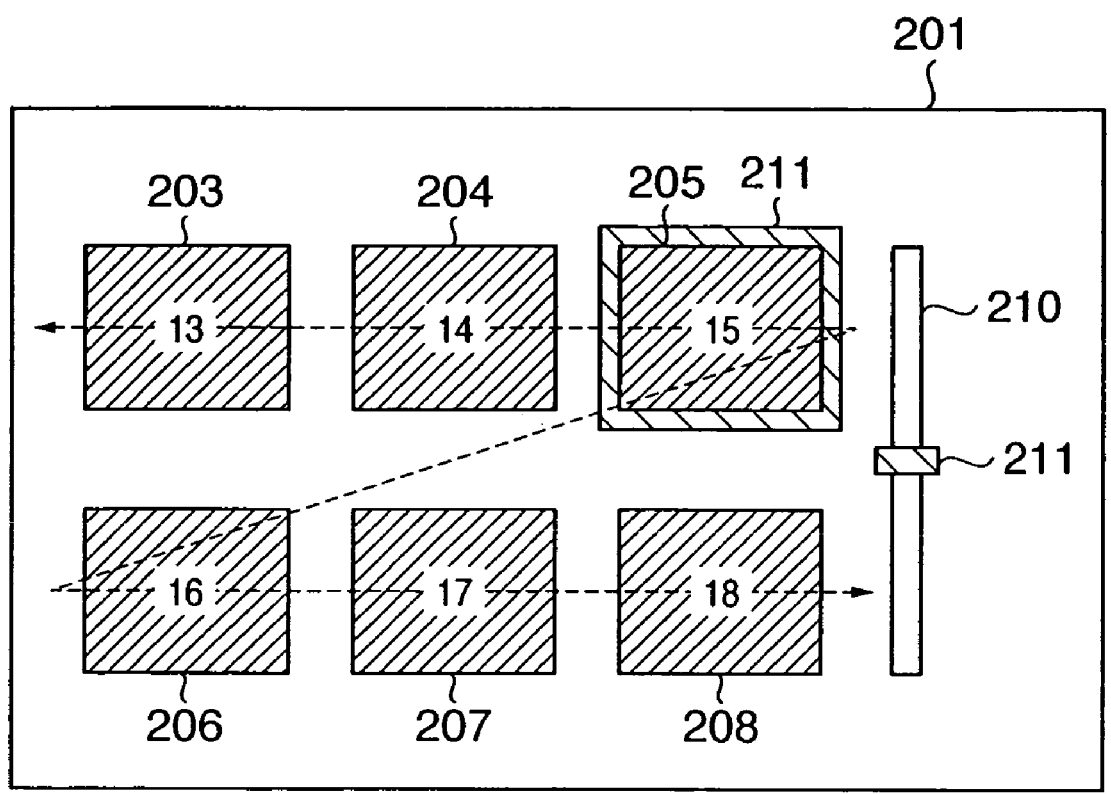
FIG. 2 is a view showing a display example of a content selection window.
Figure 14:
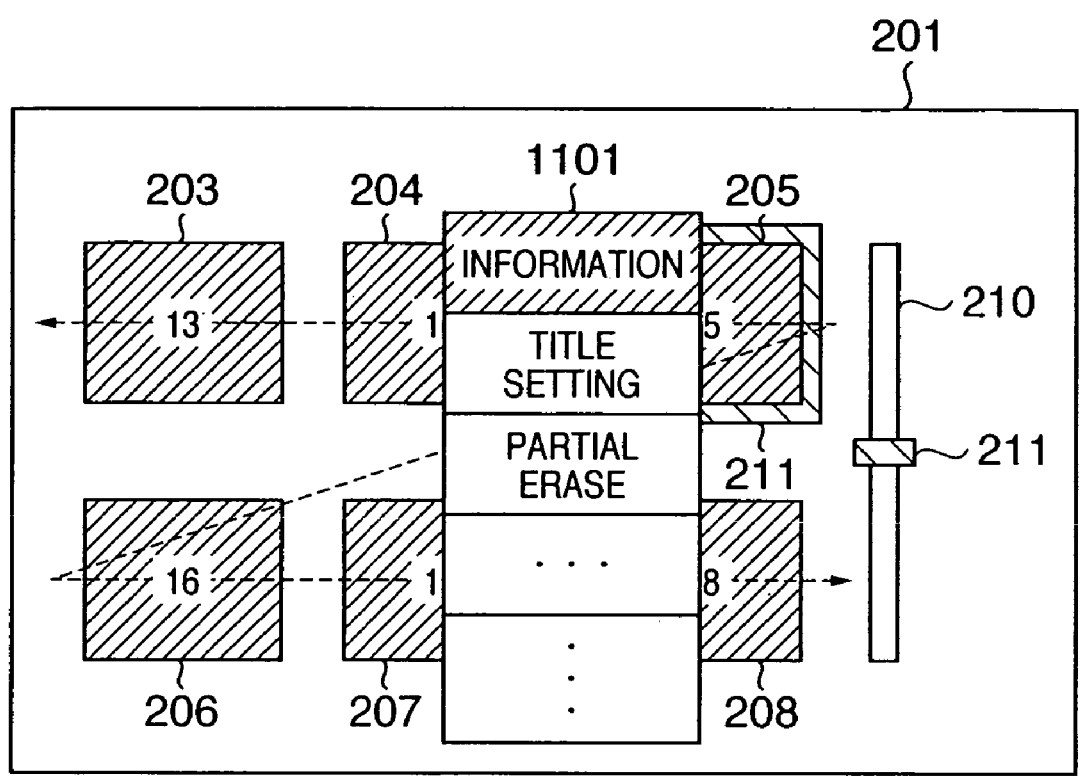
FIG. 14 is a view for explaining a menu to select the partial erase.

In the state of the content selection window shown in FIG. 2 (a content representative image 205 is selected), a menu key 909 is operated. Accordingly, a list of executable functions is displayed on the display device (not shown) such as a TV receiver by a control unit 110. FIG. 14 shows this state. Reference numeral 1101 denotes a function list 1101. In the example shown in FIG. 14, information, title setting, partial erase, or the like can be selected. In the initial state, "information" is selected.

Figure 15:
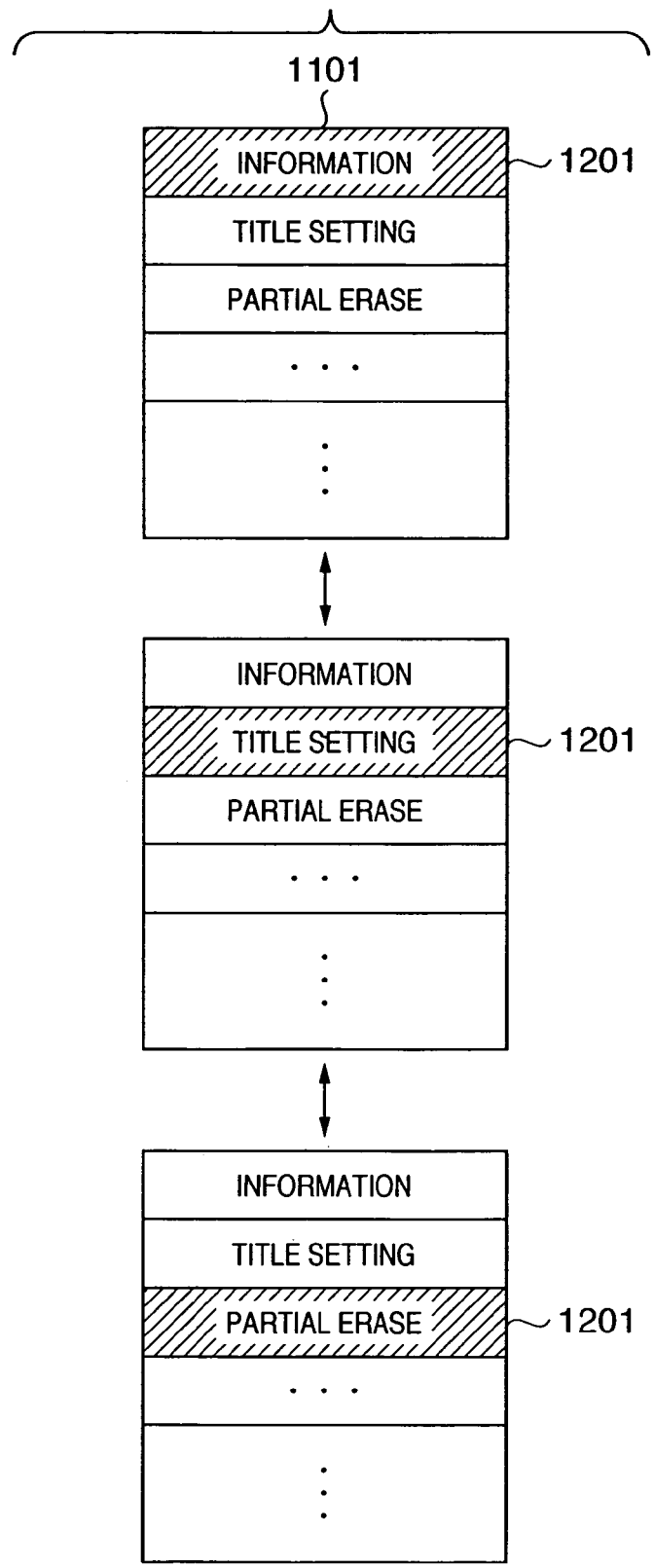
FIG. 15 is a view for explaining a method of selecting a function of the menu.

FIG. 15 is a view showing only the function list 1101. A focus 1201 indicates the currently selected function. The focus 1201 is moved as shown in FIG. 15 by operating a cursor key 911. When an enter key 917 is operated, the function selection is determined.

Figure 16:
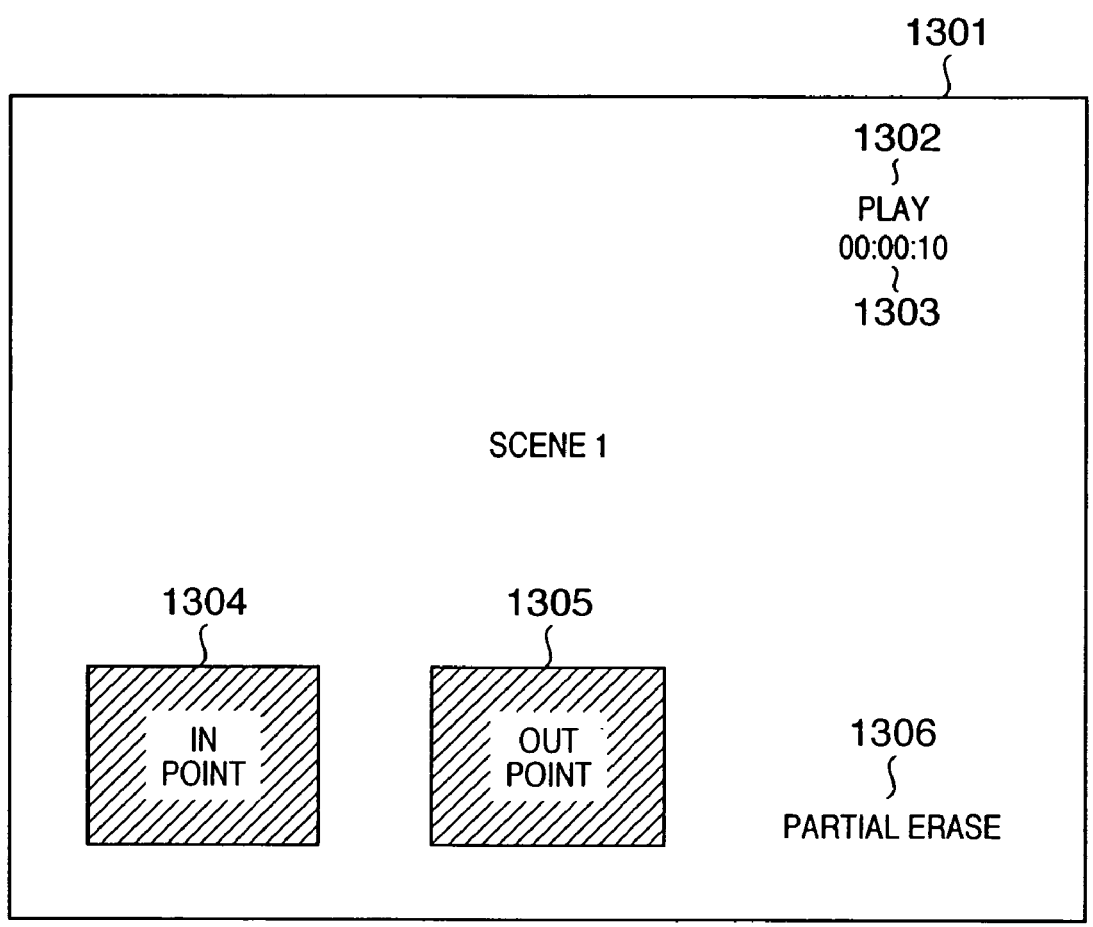
FIG. 16 is a view for explaining the partial erase.

FIG. 16 shows a display example when the partial erase is selected by this operation.

On an entire display window 1301, the content associated with the content representative image 205 is displayed. Various kinds of information to be described below are also synthesized and displayed. The content is assumed to be the same as that described with reference to FIG. 13. Reference numeral 1302 denotes information representing the play state. Since normal play is being executed now, "play" is displayed. Other examples of the play state are "pause", "fast-forward", and "rewind". A graphic pattern representing a play state may be displayed. A counter value 1303 indicates the counter value (time) of the current playback. A video image 1304 of the IN point indicates the video image at the start point of the partial erase. Since no IN point is selected yet in FIG. 16, an initial window generated by the control unit 110 is displayed. A video image 1305 of the OUT point indicates the video image at the end point of the partial erase. Since no OUT point is selected yet in FIG. 16, an initial window generated by the control unit 110 is displayed.

Figure 17A:
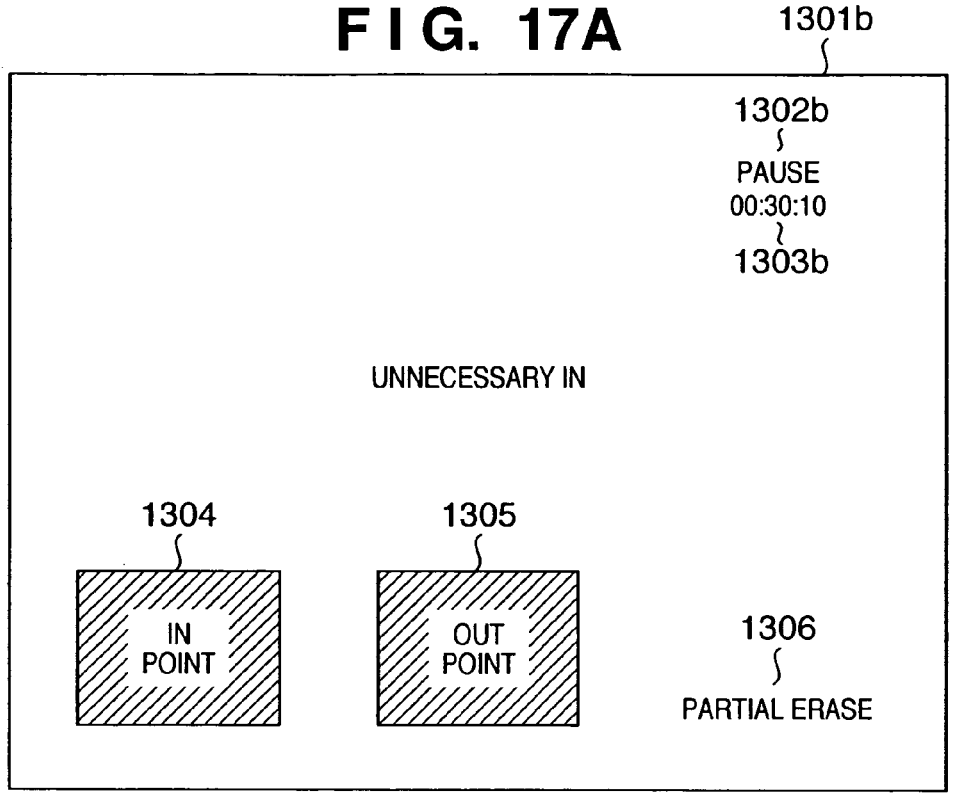
FIGS. 17A and 17B are views for explaining a display example of the partial erase.

Reference numeral 1306 denotes information representing the selected function. The information 1306 indicates that the partial erase function is being executed now. FIG. 17A shows a state in which playback is continued, or the fast-forward operation is executed by the user operation, and pause is set at the unnecessary IN point 1003 in FIG. 13. FIG. 17A shows a state immediately after the pause.

Figure 17B:
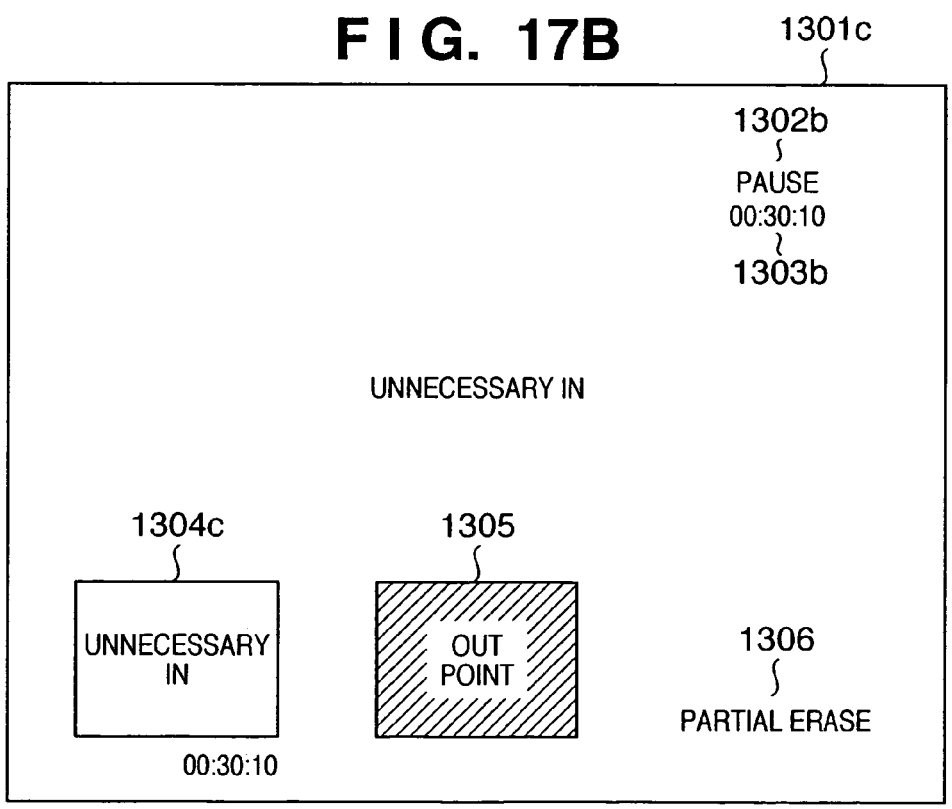

Reference numeral 1301b denotes a window obtained by superposing various kinds of information described with reference to FIG. 16 on the video image 1011 at the unnecessary IN point 1003; and 1302b, information representing the play state. The information 1302b represents that the pause is set now. When the user presses the enter key 917 in this state, the IN point of the partial erase is determined. FIG. 17B shows the display window in this state. The video image is replaced with a thumbnail image 1304c of the currently paused video image. Under the control of the control unit 110, an OSD unit 113 extracts the image data of one frame at the pause position and reduces and synthesizes it to generate the window. Simultaneously as the unnecessary IN point is determined, the control unit 110 stores the current position as the partial erase start position.

Figure 18A:
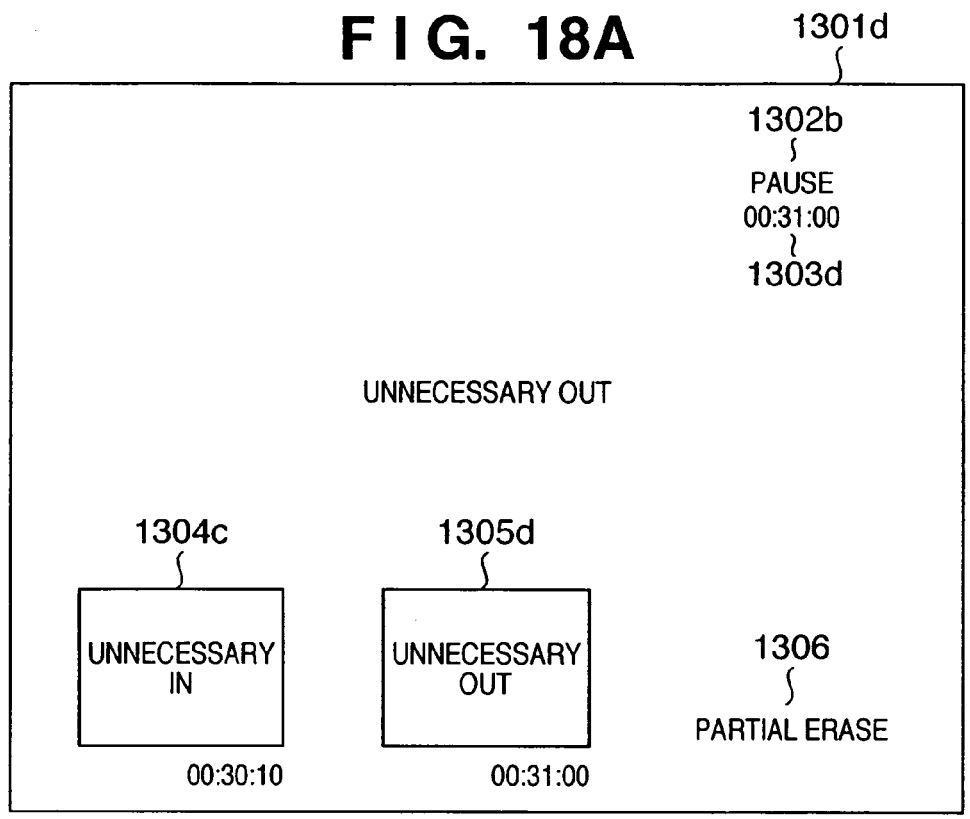
FIGS. 18A and 18B are views showing a display example until a partial erase start point is determined in the partial erase.

After that, the partial erase end point is also determined. The control unit 110 also stores the partial erase end position. FIG. 18A shows the display window at this time.

Figure 18B:
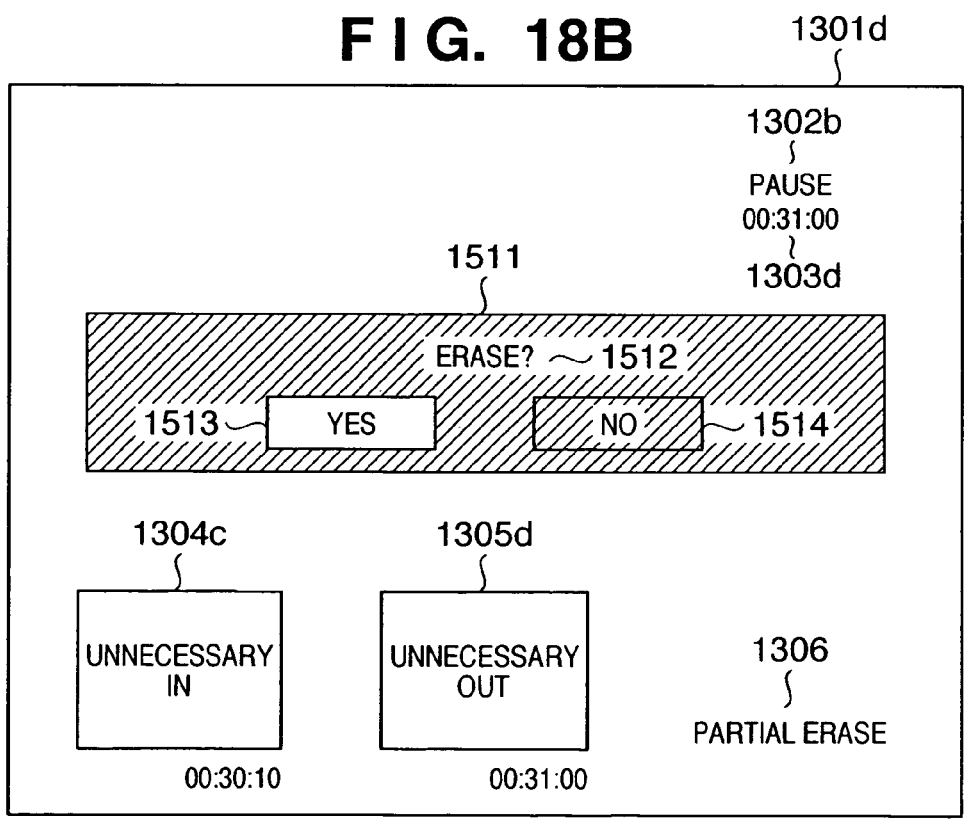

Reference numeral 1301d denotes a window obtained by superposing various kinds of information described with reference to FIG. 16 on the video image at the unnecessary OUT point 1004. The video image is replaced with a thumbnail image 1305d of the currently paused video image. FIG. 18B shows a window which is displayed simultaneously with that shown in FIG. 18A or a predetermined time after (e.g., after 1 sec). Reference numeral 1511 denotes a dialogue; 1512, a message; 1513, a "YES" button image; and 1514, a "NO" button image.

As shown in FIG. 18B, to confirm for the user whether to erase the currently designated part, the dialogue 1511 including the message 1512 is displayed. The user selects the "YES" button image 1513 or "NO" button image 1514 by operating the cursor key 911 and determines the selection by the enter key 917. When the "YES" button image 1513 is selected and determined, the partial erase is executed. By repeating this work, the user can erase only scenes to be erased.

Information display when the partial erase is executed in an optical disk containing a relay-recorded content will be described next.

Figure 19:
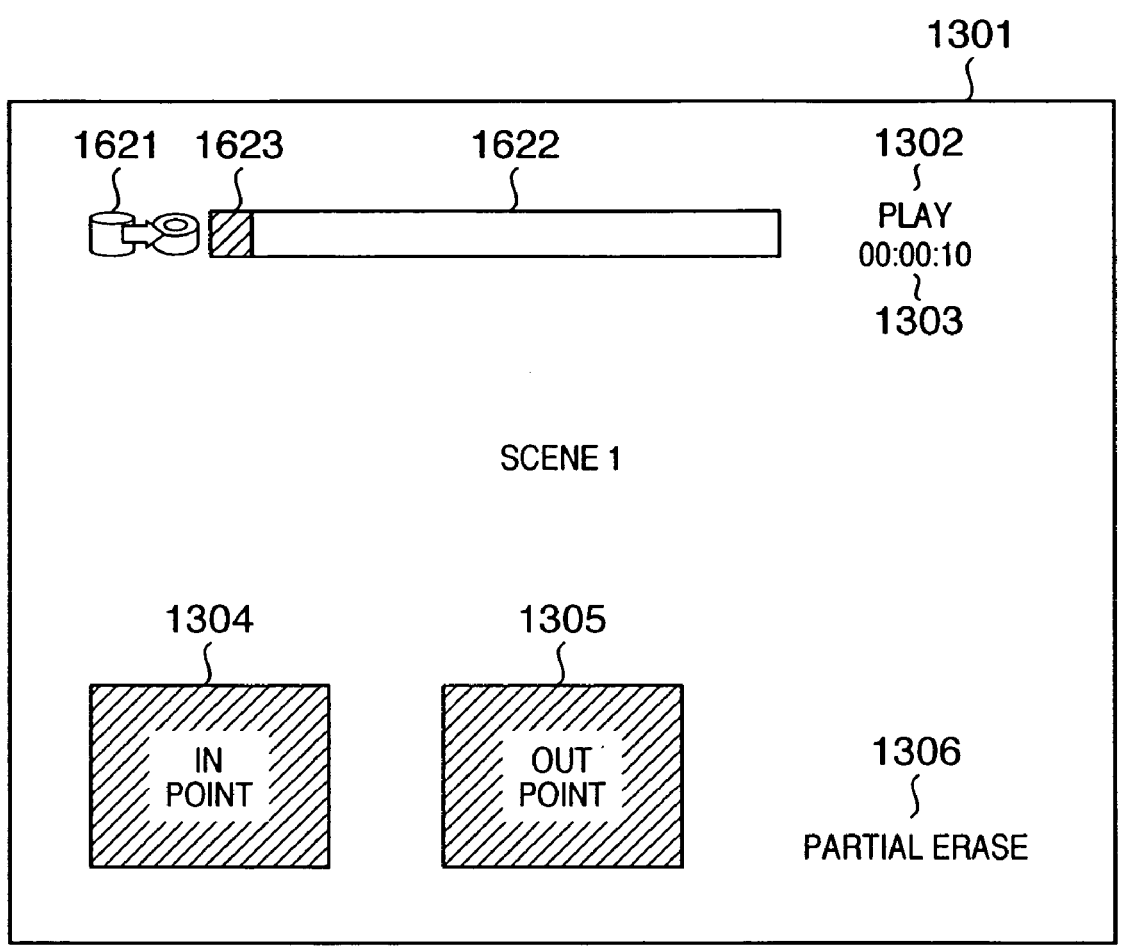
FIG. 19 is a view showing a display example from partial erase range determination to execution confirmation in the partial erase.

FIG. 19 shows a display window when the partial erase is to be executed for one of contents recorded on an optical disk containing a relay-recorded content.

Reference numeral 1621 denotes a relay recording coupling icon; 1622, a relay recording coupling indicator; and 1623, information of a recordable capacity. The relay recording coupling icon 1621 indicates that the indicator displayed on the right side is the relay recording coupling indicator 1622. The recordable capacity 1623 indicates the capacity of the optical disk D usable for moving a part of the relay-recorded content recorded in the HDD 105 to the optical disk D and coupling it. When the recordable capacity 1623 has reached the right end of the relay recording coupling indicator 1622, it indicates that the relay-recorded content part recorded in the HDD 105 can be moved to the optical disk D. The indicators 1621 to 1623 will be referred to as relay recording coupling information indicators hereinafter.

For example, assume that to move the second half data of the relay-recorded content recorded in the HDD 105, the optical disk D must have a remaining capacity of 1 GB, and the current remaining capacity is 500 MB. In this case, the recordable capacity 1623 is displayed just at the intermediate point of the relay recording coupling indicator 1622. After the relay-recorded content data recorded in the HDD 105 is moved to the optical disk D and coupled, the recording area of video data 605 which was recorded as a redundant region/period becomes blank. Hence, the recordable capacity 1623 does not become zero.

The manner the recordable capacity 1623 changes when the partial erase is executed for an optical disk containing a relay-recorded content, as described above, will be described next.

Figure 20:
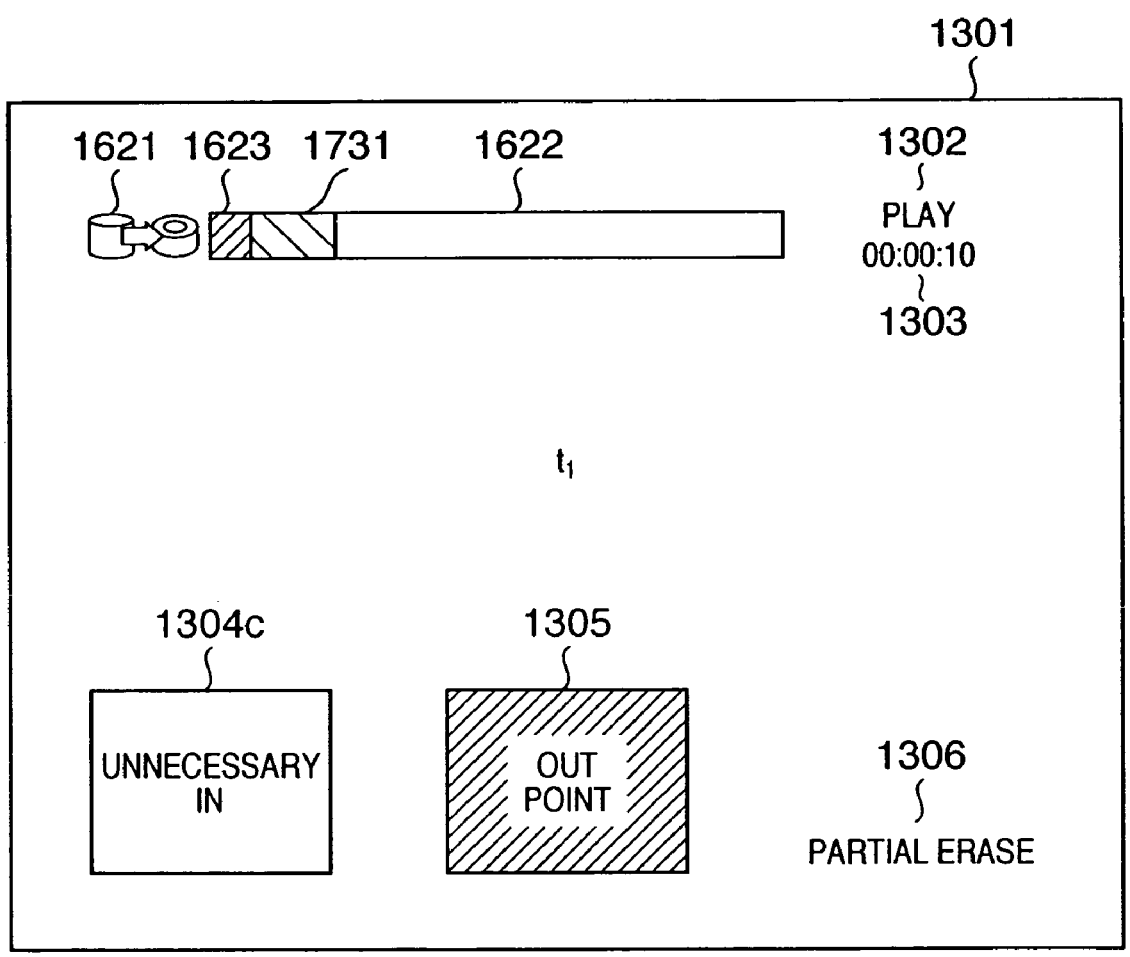
FIG. 20 is a view showing a display example in the partial erase for a relay-recorded content.

FIG. 20 shows a state in which the partial erase is started from the state shown in FIG. 19, the unnecessary IN point is determined, and playback is continued to a point t1 in FIG. 13 to designate the unnecessary OUT point. A recordable programming capacity 1731 indicates a capacity which is newly generated when the current erase candidate area, i.e., the area from the unnecessary IN point to t1 is erased.

Figure 21:
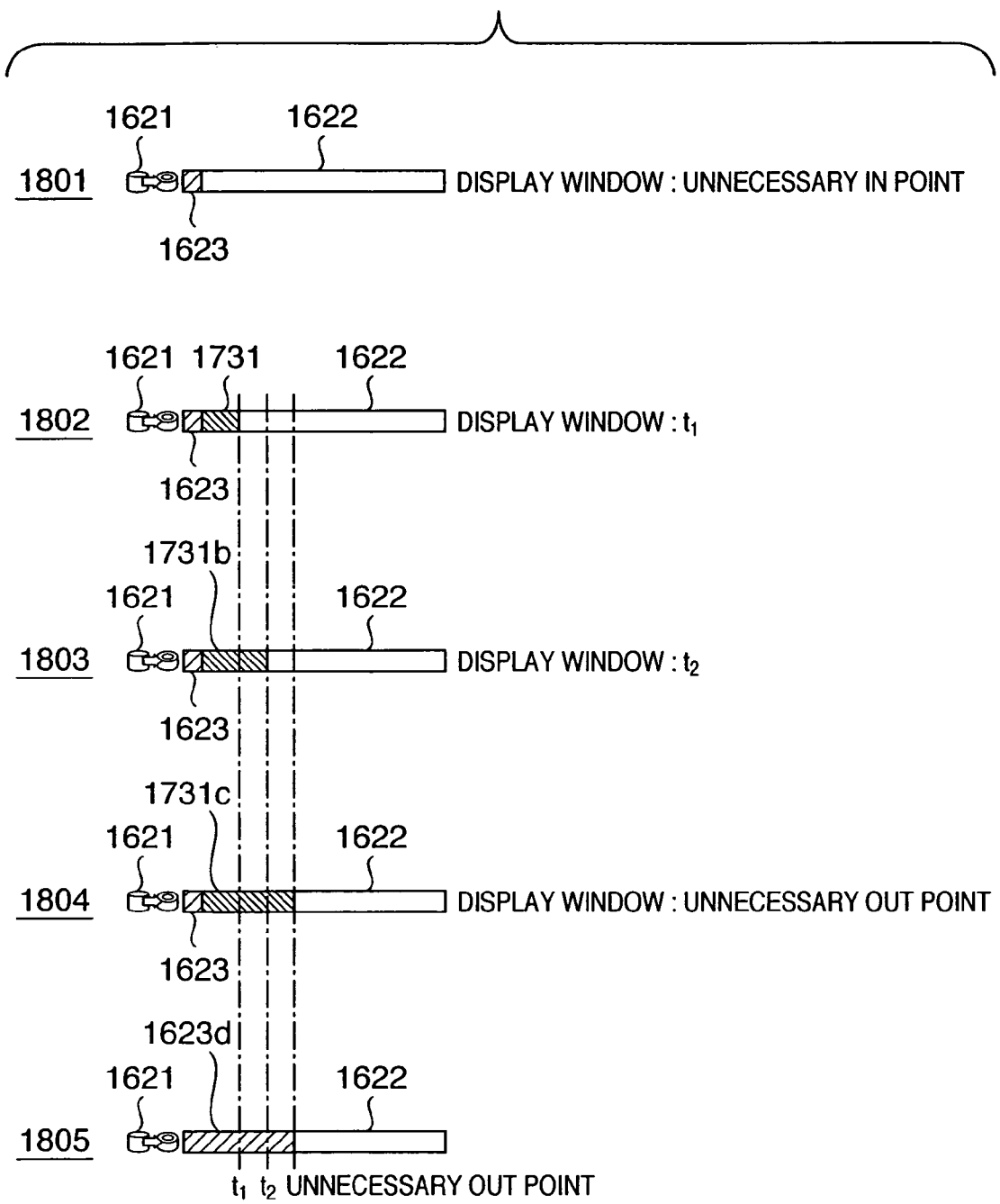
FIG. 21 is a view for explaining a change of a recordable programming capacity indicator.

The change of the recordable programming capacity 1731 will be described in more detail with reference to FIG. 21.

Reference numeral 1801 denotes a display until the unnecessary IN point is determined. The recordable programming capacity 1731 is not present yet. Then, to search for the unnecessary OUT point, the playback point of the content is moved forward by the fast-forward and playback operations. Reference numerals 1802 and 1803 denote display examples at this time. The display examples 1802 and 1803 correspond to t1 and t2 in FIG. 13, respectively. A display state 1804 is obtained when the playback point has reached the unnecessary OUT point.

A display state 1805 is obtained when the erase is determined, the dialogue 1511 shown in FIG. 18B is displayed, the user selects the "YES" button image 1513, and the partial erase is executed. The area of the recordable programming capacity 1731 is synthesized with the recordable capacity indicator 1623 into a recordable capacity indicator 1623d. When the "NO" button image 1514 is selected, the display state returns to 1801.

Figure 22:
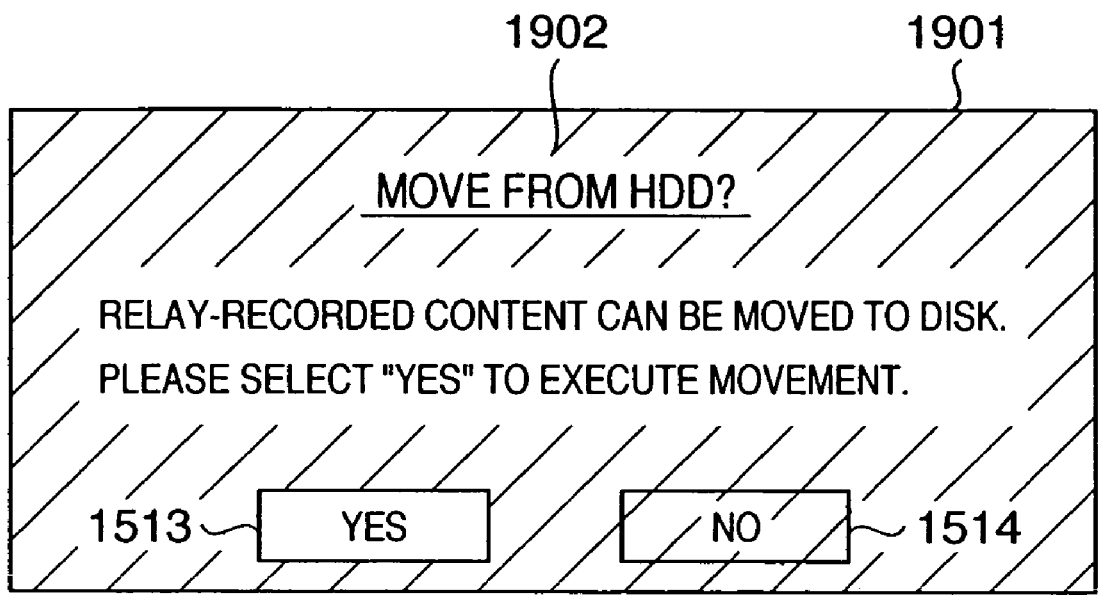
FIG. 22 is a view showing a display example of an HDD recorded part moving confirmation dialogue.

In the above-described way, the recordable programming capacity 1731 changes in real time. When the area is actually erased, the recordable programming capacity 1731 is replaced with the recordable capacity 1623. When this operation is repeated, and the recordable capacity 1623 has reached the right end of the relay recording coupling indicator 1622, it indicates that the relay-recorded content part recorded in the HDD 105 can be moved to the optical disk D, and the dialogue shown in FIG. 22 is displayed. Reference numeral 1901 denotes an HDD recorded part moving confirmation dialogue; and 1902, an HDD recorded part moving confirmation message. When the user selects the "YES" button image 1513, the erase is executed. When the user selects the "NO" button image 1514, the processing is canceled.

Figure 23:
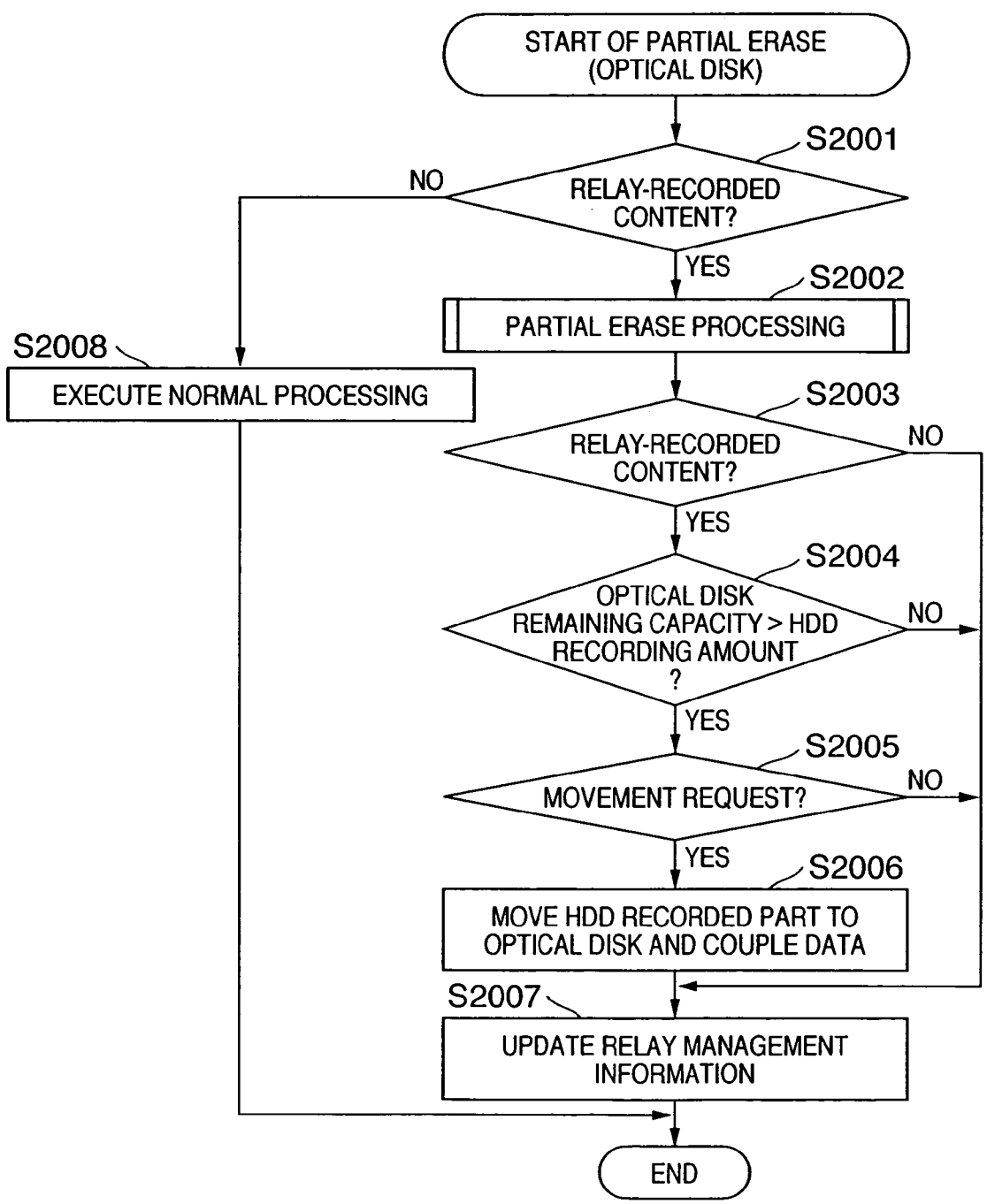
FIG. 23 is a flowchart in executing the partial erase for a content in an optical disk.

The partial erase processing and relay-recorded content moving processing related to it will be described with reference to the flowchart shown in FIG. 23.

When the partial erase of a contention the optical disk D is started, it is determined whether a relay-recorded content is present on the optical disk D (S2001). If YES in step S2001, relay recording coupling information is displayed, and partial erase processing is executed, as described above (S2002). When the partial erase is ended, it is determined again whether a relay-recorded content is present (S2003). It is determined as NO when the target of the partial erase is a relay-recorded content, and all scenes of the relay-recorded content are erased. In this case, the flow advances to step S2007 (to be described later). If the relay-recorded content is not erased, the data amount of the relay-recorded content recorded in the HDD 105 is compared with the remaining capacity of the optical disk D (S2004).

If the remaining capacity of the optical disk D is larger, it is determined whether a request for moving the relay-recorded content part recorded in the HDD 105 to the optical disk D is present (S2005). In this processing, it is confirmed for the user whether to move the relay-recorded content recorded in the HDD 105 to the optical disk D. The dialogue described with reference to FIG. 22 is displayed by controlling the OSD unit 113, and the input by the user is waited.

If YES in step S2005, the data of the relay-recorded content part recorded in the HDD 105 is played back and moved to the optical disk D. The pieces of relay management information recorded on the optical disk D and HDD 105 are updated (S2007).

Even when NO in step S2003, NO in step S2004, or NO in step S2005, the pieces of relay management information are updated in step S2007.

If NO in step S2001, the normal partial erase processing described with reference to FIGS. 16 to 18B is executed.

As described above, when a relay-recorded content is recorded on the optical disk, an unnecessary portion is erased from the disk D to create a capacity. Accordingly, the relay-recorded content part recorded in the HDD 105 can be moved to the disk D.

Figure 24:
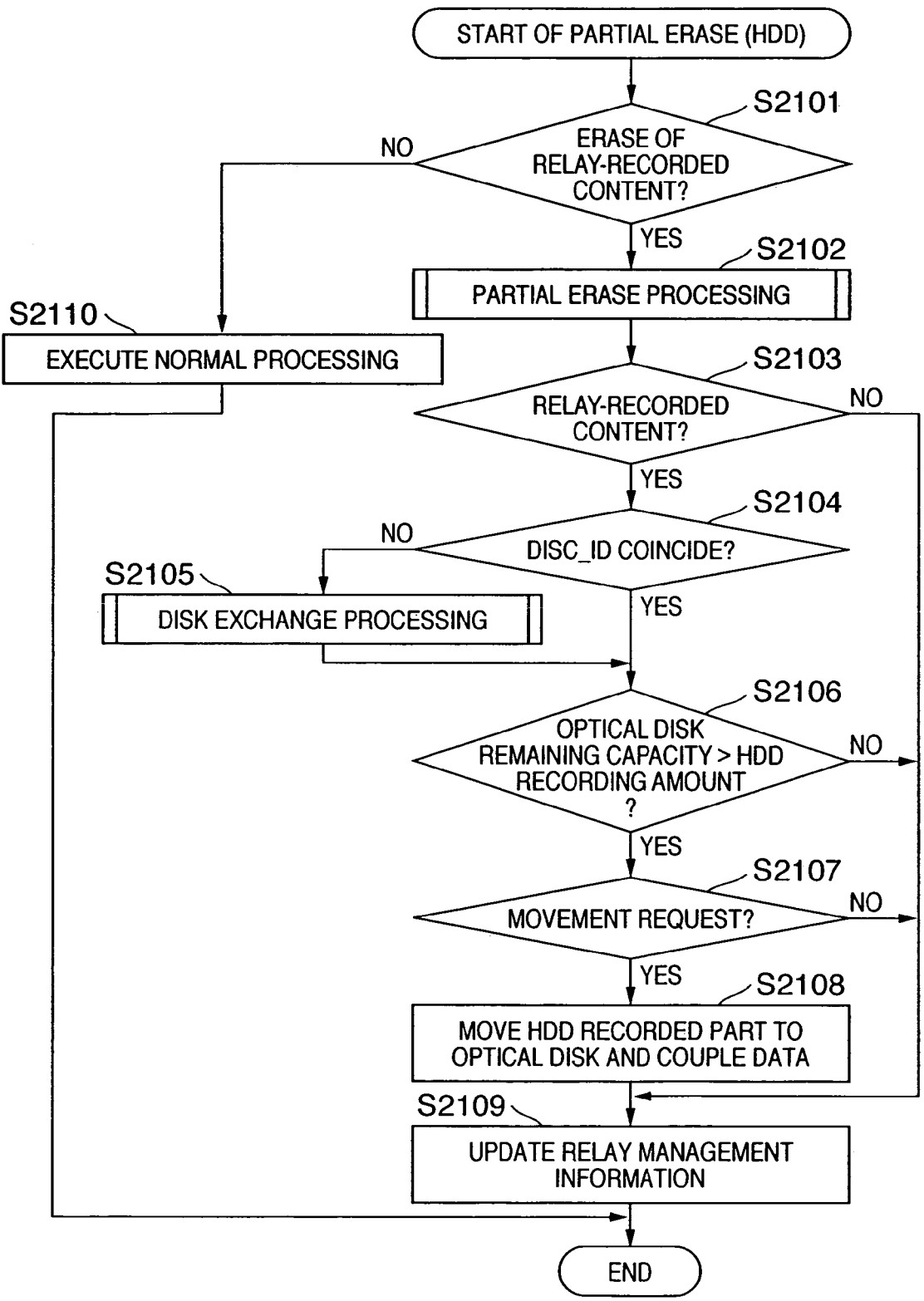
FIG. 24 is a flowchart in executing the partial erase for a content in a hard disk.

On the other hand, when the amount of a relay-recorded content recorded in the HDD 105 can be made smaller than the remaining capacity of the optical disk D by erasing part of the relay-recorded content, the relay-recorded content can also be moved to the optical disk D. FIG. 24 is a flowchart showing the processing of the control unit 110 in decreasing the data amount of a relay-recorded content recorded in the HDD 105 by deleting part of the relay-recorded content and moving it to the optical disk D, as described above.

When a partial erase instruction for a content recorded in the HDD 105 is generated, it is determined whether the content for which the partial erase instruction is issued is a relay-recorded content (S2101). If YES in step S2101, partial erase processing which is the same as that described with reference to FIGS. 20 and 21 is executed (S2102). In this case, however, the recordable programming capacity 1731 is increased by erasing the relay-recorded content from the HDD 105.

It is determined again whether part of the target relay-recorded content remains in the HDD 105 as a result of partial erase processing (S2103). If YES in step S2103, it is determined whether the disk IDs (DISC_IDs) in the relay management information recorded in the HDD 105 and optical disk D coincide with each other (S2104). If NO in step S2104, the OSD unit 113 is controlled to display warning information representing that the optical disk is different from the disk on which a relay-recorded content corresponding to the relay-recorded content in the HDD 105, which is to be moved, is recorded, and the processing waits until the corresponding disk is loaded (S2105).

If YES in step S2104, the remaining capacity of the optical disk D is compared with the data amount of the relay-recorded content which remains in the HDD 105 (S2106). If the remaining capacity of the optical disk D is larger, it is determined whether a request for moving the relay-recorded content part recorded in the HDD 105 to the optical disk D is present (S2107). In this processing, it is confirmed for the user whether to move the relay-recorded content recorded in the HDD 105 to the optical disk D. The dialogue described with reference to FIG. 22 is displayed by controlling the OSD unit 113, and the processing waits until user input.

If YES in step S2107, the relay-recorded content part recorded in the HDD 105 is moved to the optical disk D, as described above (S2108). In addition, the pieces of relay management information on the optical disk D and HDD 105 are updated.

Even when NO in step S2103, NO in step S2106, or NO in step S2107, the pieces of relay management information are updated in step S2109.

If NO in step S2101, the normal partial erase processing described with reference to FIGS. 16 to 18B is executed.

Figure 25:
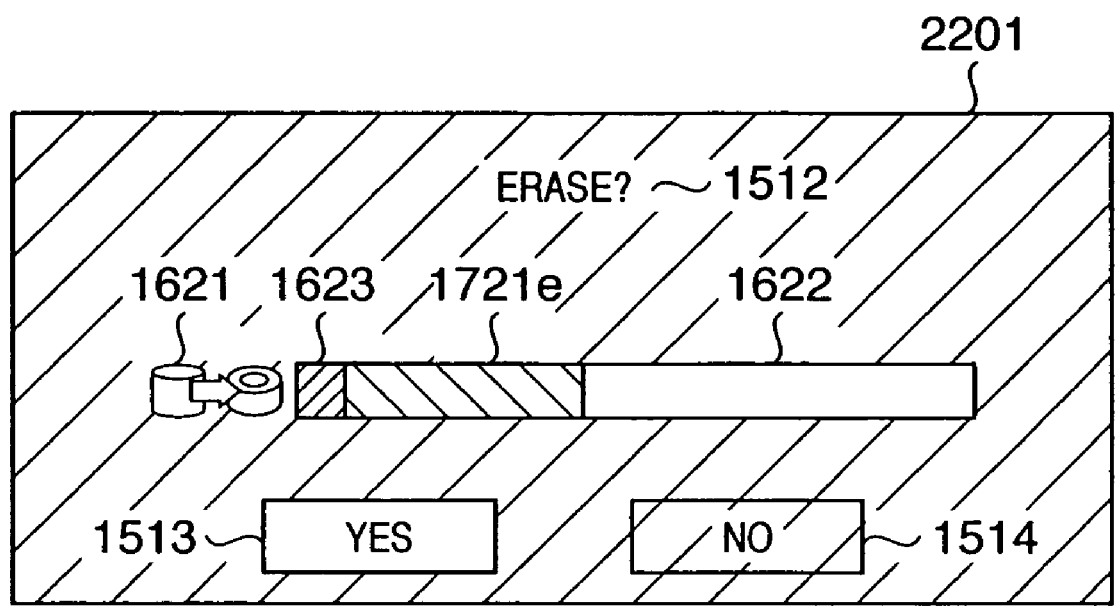
FIG. 25 is a view showing a display example of a content erase confirmation dialogue.

FIG. 25 shows a dialogue which is displayed when, of contents recorded on the optical disk D, a content other than relay-recorded contents is to be erased. A dialogue 2201 is displayed when a content is to be erased, as described above. The dialogue 2201 shown in FIG. 25 is a confirmation message which is displayed when a content is to be not partially but wholly erased if the user operates an erase key 910 during, e.g., playback or display of the content selection window shown in FIG. 2. A recordable programming capacity 1721e corresponds to a capacity which should be generated by, erasing the currently selected content. When the recordable programming capacity 1721e has reached the right end of the relay recording coupling indicator 1622, the moving dialogue 1902 is displayed to confirm movement of the HDD recorded part, as in the partial erase mode.

The movement also includes processing for putting contents recorded over an optical disk and HDD into the optical disk, coupling the contents to handle them as if they are wholly recorded on the optical disk from the beginning, and rewriting the management information.

As described above, according to this embodiment, after a content is divisionally recorded over a detachable optical disk and HDD, unnecessary data recorded on the optical disk is erased to move the data recorded in the HDD to the optical disk. At this time, the data amount necessary for recording the relay-recorded content recorded in the HDD is displayed on the optical disk data delete window. Accordingly, the user can easily recognize whether the remaining capacity of the optical disk is sufficient for the movement. Hence, the relay-recorded content divisionally recorded in the HDD can easily moved to the optical disk and coupled.

Fifth Embodiment

Still another embodiment of the present invention will be described next.

Many of the above-described recording/playback apparatuses have a digital interface to transmit/receive data and commands to/from an external device. Examples of the digital interface are IEEE 1394 and USB.

Figure 26:
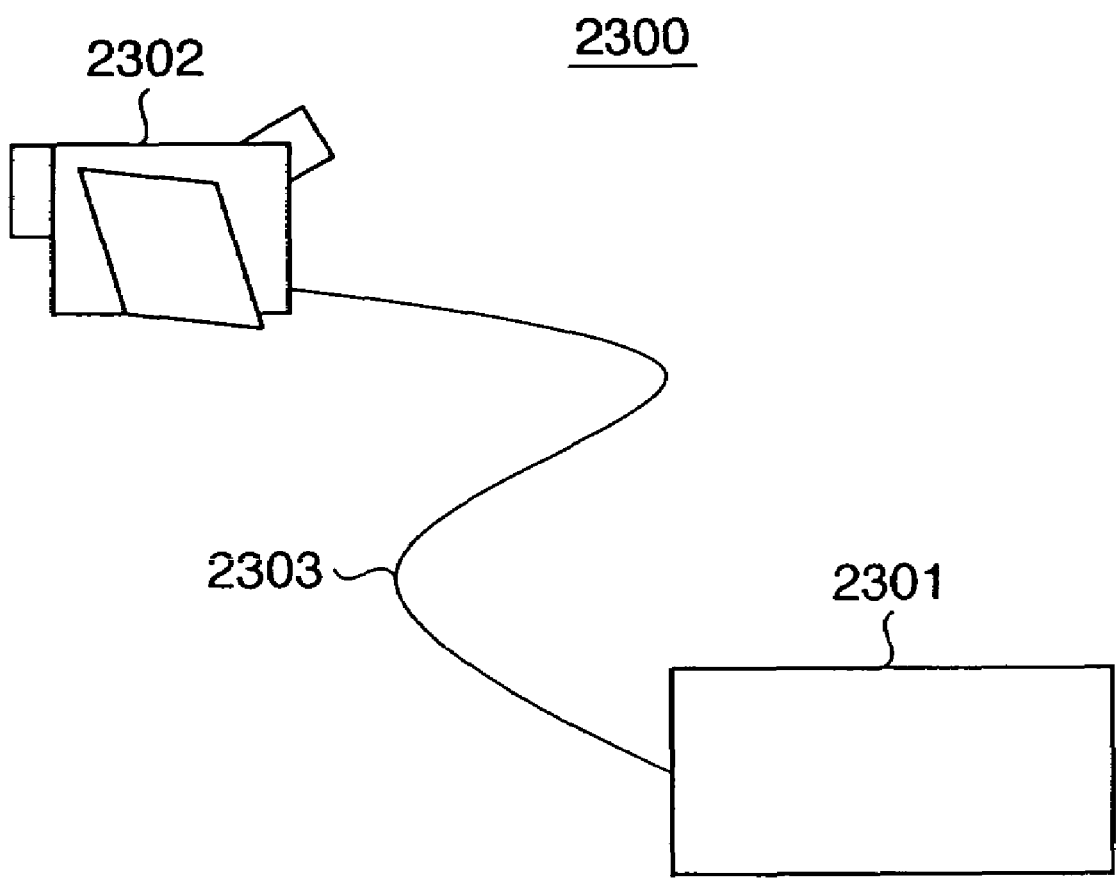
FIG. 26 is a view for explaining a system to which the present invention is applied.
Figure 27:
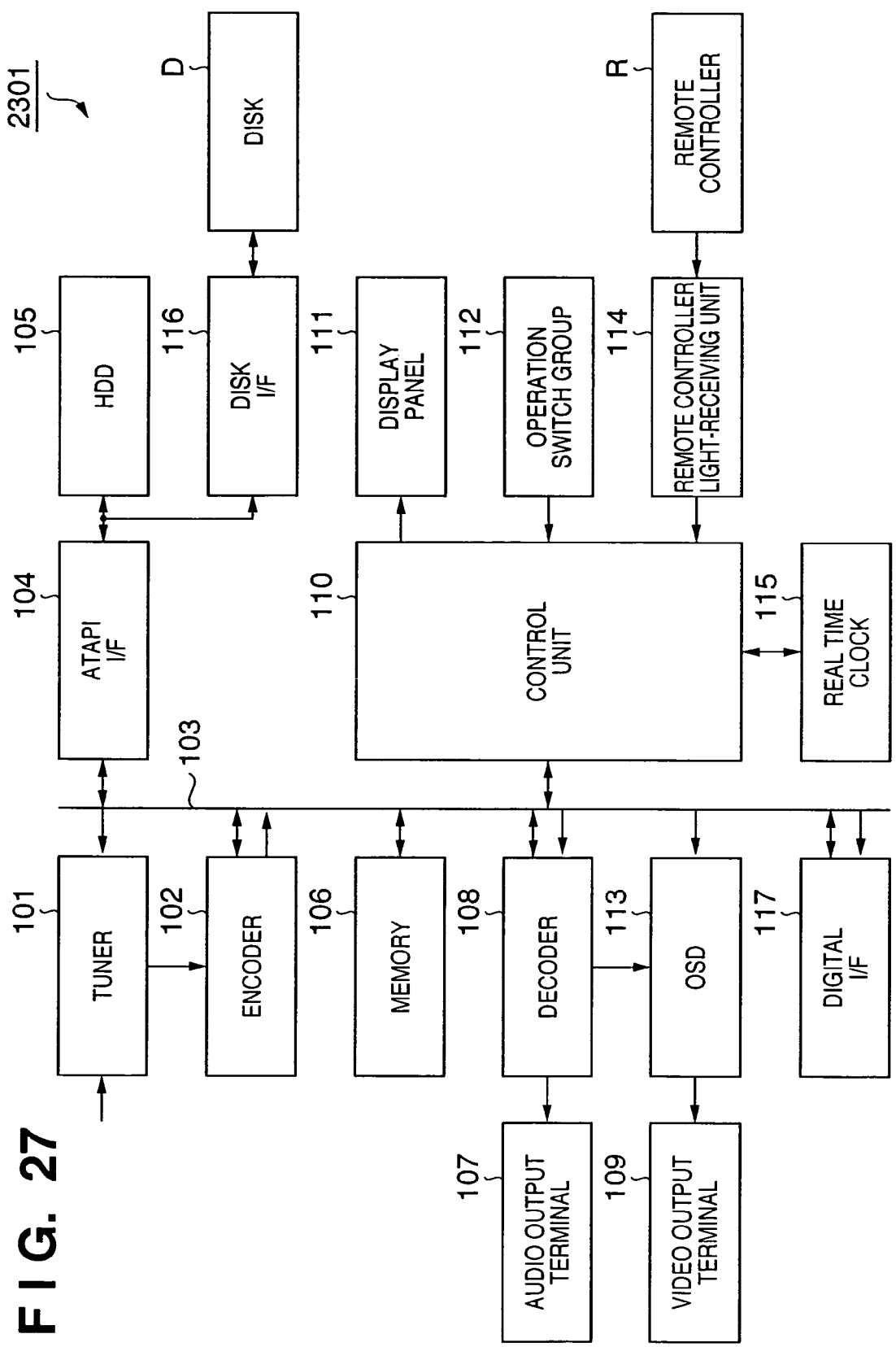
FIG. 27 is a block diagram showing another arrangement of a recording/playback apparatus to which the present invention is applied.

FIG. 26 is a view showing a system 2300 connected to a device having a digital I/F. Referring to FIG. 26, reference numeral 2301 denotes a recording/playback apparatus according to this embodiment. FIG. 27 shows the arrangement of the recording/playback apparatus. A digital video camera 2302 uses a magnetic tape as a recording medium and has a digital interface connectable to the recording/playback apparatus 2301. The digital video camera 2302 writes a reference marker at the recording start portion. A reference marker can also be written at an arbitrary portion by the user operation. The recording/playback apparatus 2301 and digital video camera 2302 are connected by a cable 2303 to transmit data.

This system is used to, e.g., transmit video data sensed by the digital video camera 2302 to the recording/playback apparatus 2301 and copy the data to a writable optical disk such as a DVD-R or DVD-RAM.

FIG. 27 shows another arrangement of the recording/playback apparatus 2301 according to this embodiment.

The recording/playback apparatus shown in FIG. 27 has almost the same arrangement as the recording/playback apparatus shown in FIG. 1 except a digital I/F unit 117. Data transmission/reception to/from the digital video camera 2302 or another device can be done through the digital I/F 117.

The flow of data when the recording/playback apparatus 2301 and digital video camera 2302 are connected, and the recording/playback apparatus 2301 is caused to record video data transmitted from the digital video camera 2302 will be described with reference to FIG. 28.

Figure 28:
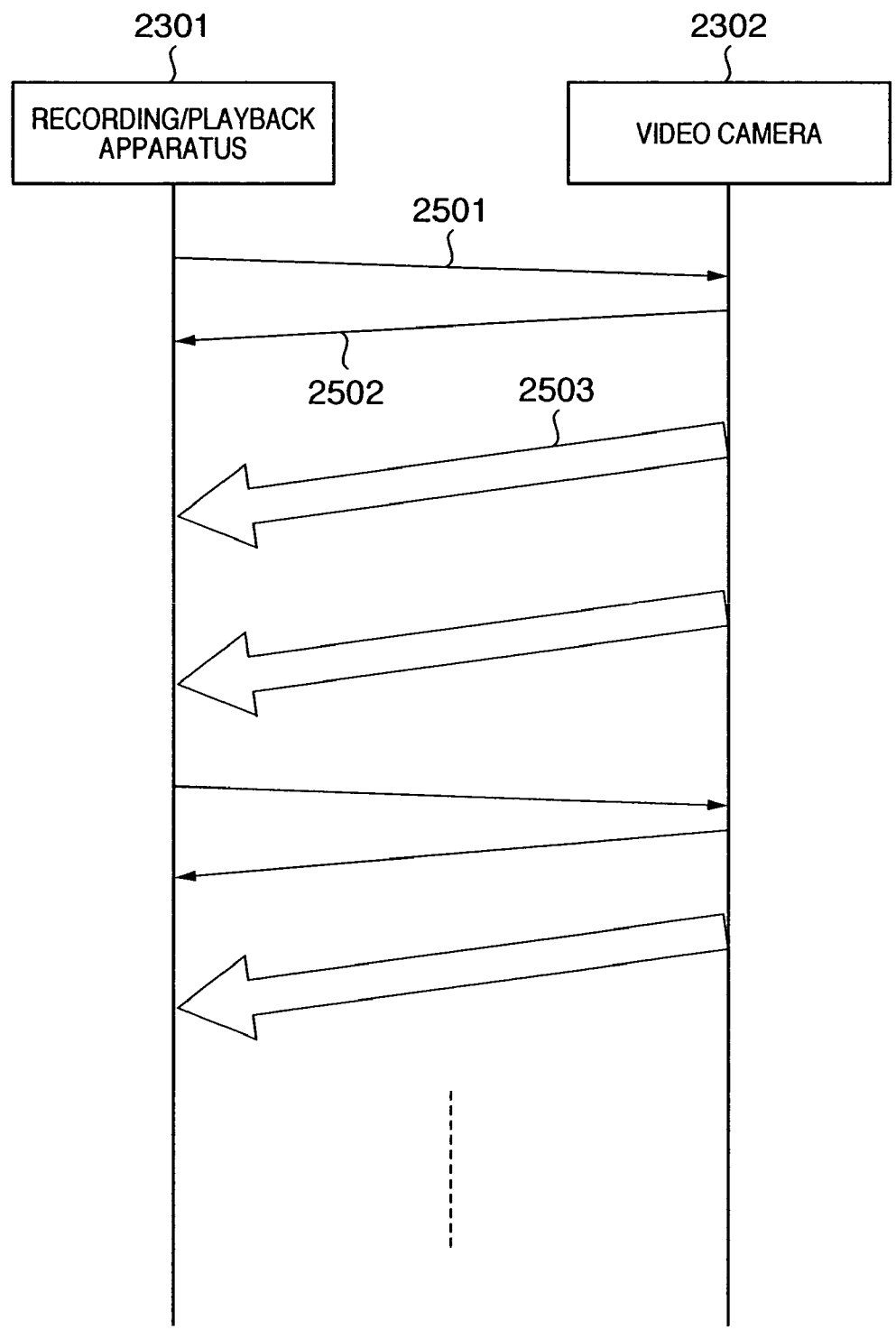
FIG. 28 is a sequence chart for explaining data transmission by a digital interface.

FIG. 28 is a so-called sequence chart showing the flow of data between the recording/playback apparatus 2301 and the digital video camera 2302.

Reference numeral 2501 denotes data which is transmitted from the recording/playback apparatus 2301 to the digital video camera 2302. In this example, the data 2501 is a control command. Reference numeral 2502 denotes a response message to the control command 2501; and 2503, video data transmitted from the digital video camera 2302 to the recording/playback apparatus 2301.

The control command 2501 is, e.g., a playback command. In accordance with the command 2501, playback of the video tape is started, and the video data 2503 is transmitted. Even during transfer of the video data, control command transmission/reception can be done.

Hence, when a control command to request the status of the digital video camera 2302 is issued at a predetermined interval, various kinds of information such as the presence/absence of a reference marker, time code, and recording date/time can be acquired. The recording/playback apparatus 2301 can record the received video data on an optical disk D or HDD 105. The data can be recorded on the optical disk D and HDD 105 simultaneously or alternately in real time.

An operation of causing the recording/playback apparatus 2301 to record, on the optical disk D, video data received from the digital video camera 2302 in this system will be described with reference to FIG. 29.

FIG. 29 is a view showing an image of video data. Reference numeral 2602 denotes data recorded on the optical disk D; and 2603, a region recorded in the HDD 105. When the user selects the optical disk D and inputs a recording start instruction, recording of video data received through the digital I/F 117 starts. In this embodiment, data recording is started on both the optical disk D and HDD 105. Reference numerals 2601*a* to 2601*d* denote positions of reference markers contained in the received video data.

Assume that data during a period 2604 is recorded on the optical disk D as a result of recording. The remaining data cannot be recorded on the disk D because of a shortage of its capacity. In this embodiment, data from the last reference marker 2601*d* recorded on the optical disk D to the recording stop point is backed up in the HDD 105. Data recorded in the HDD 105 before the reference marker 2601*d* is deleted from the HDD 105. Hence, only data during a period 2605 is recorded in the HDD 105 eventually.

With this operation, for example, the user can exchange the disk with a new optical disk and easily move the data from the reference marker 2601*d*, which is recorded in the HDD 105 as backup data, to the new disk.

Referring to FIG. 29, the data recorded in the HDD 105 as backup data may be deleted every time a reference marker is detected. At the end of recording, of the data recorded on the optical disk D, data from the reference marker 2601*d* may be deleted. The user may be inquired about whether to delete the data. At the start of recording, remaining tape amount information may be acquired from the digital video camera. If the data can wholly be recorded on the optical disk D, backup recording in the HDD 105 may be stopped.

Relay recording management information may be recorded, as described in the above embodiments, at the time of backup recording in the HDD 105 and played back as in the above-described embodiments. Not the reference marker but a switching position of the audio mode such as a bilingual, stereo, or monaural mode may be used. In this embodiment, dubbing from the digital video camera has been described. In recording a broadcast wave, it is effective to detect the audio switching position.

As described above, according to this embodiment, video data transmitted from an external device such as a digital video camera is received and recorded on an optical disk. Even when the video data amount exceeds the remaining recordable capacity of the optical disk, the data can be backed up in the HDD. At this time, since the boundary of data recorded over the optical disk and HDD is determined by detecting a reference marker in the received video data, the data can be divided at an appropriate portion of the content.

The present invention is not limited to the above-described hardware, software, window structure, and design if similar functions can be implemented. For example, the present invention can be applied to software which runs on a personal computer incorporating a tuner to implement the above-described functions.

If the capacity necessary for recording can be calculated in advance as in recording programming, relay recording need not be executed. If the capacity of the optical disk is too small, data may be recorded in the HDD.

According to the above-described embodiments, assume that during recording on a detachable recording medium, backup recording (relay recording) is done in an internal bulk recording medium due to a shortage of the capacity. If a capacity is generated in the detachable recording medium later, it is automatically determined whether the backup-recorded part can be moved to the free space. Hence, the confirmation operation by the user is unnecessary. A recording/playback apparatus which can also automatically move data if it is possible can be implemented.

In addition, a recording/playback apparatus can be implemented, which is capable of, when a moving image is recorded, on an optical disk, from an external device which cannot detect the necessary recording capacity in advance, and the data amount exceeds the remaining capacity of the optical disk, backing up a region from an appropriate position in the bulk recording medium and easily recording the part on the next optical disk.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application Nos. 2003-409017 and 2003-409018 filed on Dec. 8, 2003, which are hereby incorporated by reference herein.

What is claimed is:

1. A recording apparatus comprising:
   acquisition means for acquiring information data;
   first recording means for recording the information data acquired by said acquisition means on a recording medium;
   second recording means for recording the information data acquired by said acquisition means on a recording medium; and
   control means for controlling said first recording means and said second recording means to (a) divide the information data representing a series of contents into a first part and a second part, (b) record the first part of the information data on a first recording medium and subsequently the second part of the information data on a second recording medium, (c) generate identification information indicating that the information data is divisionally recorded on the first recording medium and the second recording medium, and (d) record the identification information on the first recording medium and the second recording medium;
   first playback means for playing back the information data from the first recording medium;
   second playback means for playing back the information data from the second recording medium; and
   selection means for arbitrarily selecting one of the first recording medium and the second recording medium,
   wherein if the second recording medium is selected by said selection means, in response to an instruction to start playing back the second part of the information data recorded on the second recording medium, said control means detects, on the basis of the identification information recorded on the first recording medium and the second recording medium, whether the first part of the information data, corresponding to the second part of the information data recorded on the second recording medium, is recorded on the first recording medium, and
   wherein if said control means detects that the first part of the information data is recorded on the first recording medium, said control means controls said first playback means and said second playback means to play back first the first part of the information data from the first recording medium and subsequently the second part of the information data from the second recording medium, and if said control means detects that the first part of the information data is not recorded on the first recording medium, said control means controls said first playback means and said second playback means to play back the second part of the information data from the second recording medium without playing back any information data from the first recording medium.

2. The apparatus according to claim 1, wherein if the first recording medium is selected by said selection means, in response to an instruction to start playing back the first part of the information data recorded on the first recording medium, said control means detects, on the basis of the identification information recorded on the first recording medium and the second recording medium, whether the second part of the information data corresponding to the first part of the information data recorded on the first recording medium is recorded on the second recording medium, and if so, said control means further controls, on the basis of the identification information recorded on the first recording medium and the second recording medium, said first playback means and said second playback means to play back the first part of the information data from the first recording medium and subsequently the second part of the information data from the second recording medium.

3. The apparatus according to claim 2, further comprising output means for outputting the information data played back from the first recording medium and the second recording medium to a display device,
wherein said control means controls said first recording means and said second recording means to redundantly record, on the second recording medium, the first part of the information data during a predetermined period immediately before stop of recording of the first part of the information data on the first recording medium, and switches the information data output from said output means from the first part of the information data played back by said first playback means to the second part of the information data played back by said second playback means by using the redundantly recorded information data.

4. The apparatus according to claim 2, wherein when the second part of the information data corresponding to the first part of the information data recorded on the first recording medium is not recorded on the second recording medium, said control means controls said first playback means to stop playback after the first part of the information data recorded on the first recording medium is played back.

5. The apparatus according to claim 4, wherein the information data contains video data,
wherein said control means controls said first recording means to generate notification video data to notify a user that the first part of the information data is recorded on the first recording medium, and to record the notification video data on the first recording medium, and
when the second part of the information data corresponding to the first part of the information data recorded on the first recording medium is not recorded on the second recording medium, said control means controls said first playback means to stop playback after the notification video data is played back after the first part of the information data recorded on the first recording medium.

6. The apparatus according to claim 5, further comprising encoding means for encoding input video data and compressing an information amount of the video data,
wherein said first recording means records the video data, which is included in the first part of the information data and encoded by said encoding means, on the first recording medium, and records the notification video data encoded by said encoding means on the first recording medium.

7. The apparatus according to claim 5, wherein said control means stops recording of the second part of the information data on the second recording medium and then generates the notification video data on the basis of a recording time of the second part of the information data recorded on the second recording medium.

8. The apparatus according to claim 4, wherein the information data contains audio data,
wherein said control means controls said first recording means to generate notification audio data to notify a user that the first part of the information data recorded on the first recording medium is the divisionally recorded information data, and to record the notification audio data on the first recording medium, and
when the second part of the information data corresponding to the first part of the information data recorded on the first recording medium is not recorded on the second recording medium, said control means controls said first playback means to stop playback after the notification audio data is played back after the first part of the information data recorded on the first recording medium.

9. The apparatus according to claim 1, wherein the first recording medium can be ejected from the recording apparatus by an ejecting mechanism, and
wherein the second recording medium is incorporated in the recording apparatus and cannot be ejected from the apparatus by the ejecting mechanism.

10. The apparatus according to claim 9, wherein the first recording medium includes an optical disk medium, and
wherein the second recording medium includes a hard disk medium.

11. The apparatus according to claim 1, wherein said control means detects a remaining recording capacity of the first recording medium during recording the information data representing the series of contents on the first recording medium and controls, when the remaining recording capacity has reached a predetermined amount, said first recording means and said second recording means to (a) divide the information data representing a series of contents into the first part and the second part, (b) start recording the second part of the information data on the second recording medium, and (c) stop recording the first part of the information data on the first recording medium.

12. The recording apparatus according to claim 1, wherein said control means controls, when the first recording medium has obtained a recordable capacity capable of recording the second part of the information data recorded on the second recording medium as a result of delete processing of information data other than the first part of the information data from the first recording medium, said first recording means and said second recording means to move the second part of the information data from the second recording medium to the first recording medium.

* * * * *